US012697673B2

(12) United States Patent
Huh et al.

(10) Patent No.: US 12,697,673 B2
(45) Date of Patent: Aug. 4, 2026

(54) WELDING GUIDING SYSTEM PROVIDING HIGH-QUALITY IMAGES

(71) Applicant: OTOS WING.CO., LTD., Geumcheon-gu (KR)

(72) Inventors: Moon Young Huh, Geumcheon-gu (KR); Sung Won Huh, Yangcheon-gu (KR)

(73) Assignee: OTOS WING.CO., LTD., Seoul (KR)

( * ) Notice: Subject to any disclaimer, the term of this patent is extended or adjusted under 35 U.S.C. 154(b) by 840 days.

(21) Appl. No.: 16/880,353

(22) Filed: May 21, 2020

(65) Prior Publication Data

US 2020/0368840 A1 Nov. 26, 2020

(30) Foreign Application Priority Data

| | | |
|---|---|---|
| May 22, 2019 | (KR) | 10-2019-0060226 |
| Sep. 20, 2019 | (KR) | 10-2019-0116350 |
| Sep. 20, 2019 | (KR) | 10-2019-0116352 |

(51) Int. Cl.
*B23K 9/095* (2006.01)
*B23K 31/12* (2006.01)

(52) U.S. Cl.
CPC .......... *B23K 9/0956* (2013.01); *B23K 31/125* (2013.01)

(58) Field of Classification Search
CPC ......... B23K 9/0956; B23K 9/095; B23K 9/32
(Continued)

(56) References Cited

U.S. PATENT DOCUMENTS

2005/0001155 A1* 1/2005 Fergason ................. B23K 9/32
250/221
2012/0291172 A1 11/2012 Wills et al.
(Continued)

FOREIGN PATENT DOCUMENTS

| | | |
|---|---|---|
| CN | 107980153 A | 5/2018 |
| EP | 3232656 A1 | 10/2017 |

(Continued)

OTHER PUBLICATIONS

Serles, Carmeron, "Why Weld Cameras Need High Dynamic Range Imaging", Aug. 29, 2014, https://blog.xiris.com/blog/bid/258666/Why-Weld-Cameras-Need-High-Dynamic-Range-Imaging.
(Continued)

*Primary Examiner* — Steven W Crabb
*Assistant Examiner* — Alba T Rosario-Aponte
(74) *Attorney, Agent, or Firm* — Kilpatrick Townsend & Stockton LLP

(57) ABSTRACT

The disclosure relates to a welding system supporting a high-quality image and relates to a welding system configured to provide an image guiding a welding state of a user. The welding system includes a display unit including a front surface portion corresponding to a welding direction and a rear surface portion corresponding to a face portion direction; at least one eyepiece display installed in an area of the rear surface portion of the display unit; at least one camera unit installed in an area of the front surface portion of the display unit and configured to obtain a plurality of welding image frames according to a photographing condition of each frame; and a processor configured to control the photographing condition of the at least one camera unit, obtain a first synthesized image by synthesizing the plurality of welding image frames in parallel based on the plurality of
(Continued)

welding image frames, and control the eyepiece display to display the first synthesized image.

1 Claim, 24 Drawing Sheets

(58) Field of Classification Search
USPC ............... 219/130.01, 130.33, 130.21, 130.5
See application file for complete search history.

(56) References Cited

U.S. PATENT DOCUMENTS

| | | | |
|---|---|---|---|
| 2016/0125653 A1* | 5/2016 | Denis ..................... | G06F 3/012 |
| | | | 348/90 |
| 2016/0175964 A1* | 6/2016 | Penoyer ............... | B23K 9/0956 |
| | | | 219/137 R |
| 2016/0267806 A1* | 9/2016 | Hsu ........................ | G09B 19/24 |
| 2017/0173720 A1 | 6/2017 | Sumner | |
| 2018/0071854 A1* | 3/2018 | Matthews ................ | H04N 5/33 |

FOREIGN PATENT DOCUMENTS

| | | | | |
|---|---|---|---|---|
| JP | 2010266308 | A | * | 11/2010 |
| KR | 10-1050708 | B1 | | 7/2011 |
| KR | 20120091543 | A | | 8/2012 |
| KR | 20130011711 | A | | 1/2013 |
| KR | 101673242 | B1 | | 11/2016 |
| KR | 2017/0011854 | A | | 2/2017 |
| KR | 2019/0021090 | A | | 3/2019 |
| WO | 2016118247 | A1 | | 7/2016 |
| WO | 2016/144744 | A1 | | 9/2016 |

OTHER PUBLICATIONS

Lanman, et, al., "Near-Eye Light Field Displays", NVIDIA Research, ACM Transactions on Graphics, vol. 32, No. 6, Article 220, Nov. 2013.
Office Action for CN Patent Appln. 202010430827.1 dated Jun. 3, 2021, 11 pages.
French Preliminary Search Report and Written Opinion for FR2005205 dated Mar. 3, 2022, 11 pages. An English translation is not available.
Office Action dated Mar. 30, 2020 for KR 10-2019-0060226, all pages.

* cited by examiner

FIRST CAMERA      SECOND CAMERA      THIRD CAMERA 132-1      132-2

1010      1020

~1110

~1120

WELDING GUIDING SYSTEM PROVIDING HIGH-QUALITY IMAGES

CROSS-REFERENCE TO RELATED APPLICATIONS

This application claims the benefits of Korean Patent Application No. 10-2019-0060226, filed on May 22, 2019, Korean Patent Application No. 10-2019-0116350, filed on Sep. 20, 2019, Korean Patent Application No. 10-2019-0116352, filed on Sep. 20, 2019, in the Korean Intellectual Property Office, the disclosures of which are incorporated herein in their entirety by reference.

BACKGROUND

1. Field

One or more embodiments relate to a welding guiding system.

2. Description of Related Art

Wearing protective equipment is to protect operators from light, high temperature of heat, or the like generated during a welding operation. In a state with the protective equipment on, the operators may only confirm that welding is performed through the protective equipment. Therefore, removing the protective equipment so as to check, with the naked eyes, various welding information, such as conditions set in a welding device, is complicated.

When skill levels of the operators are not high, especially when wearing an automatic welding visor or a manual welding visor, the operators may only view a portion adjacent to welding light, and a particular welding situation such as an environment surrounding the welding is difficult to be recognized. Accordingly, providing, to the operators, high-quality images in which the operators may check the environment surrounding the welding and providing, to the operators, particular information with respect to welding state information are required.

Moreover, since an illumination intensity/brightness of a welding light spot is very high during a welding operation, a blackening filter is used to protect the operators' eyes from the welding light spot and facilitate the welding operation. In this case, areas other than the welding light spot are completely invisible and the welding operation becomes very difficult, and the accuracy of welding may also be deteriorated.

The above-stated problem not only happens in a welding operation, but may also affect medical staff during skin procedures and/or treatments using light having high brightness/high illumination intensity, such as laser light, and may also happen in other operations using light having high brightness/high illumination intensity.

SUMMARY

One or more embodiments include a welding information providing device capable of improving the welding accuracy of operators by showing the operators a welding spot and an environment surrounding welding.

One or more embodiments include a system guiding information with respect to welding state information to operators.

The disclosure may provide accurate information to users during an operation dealing with light having high brightness/high illumination intensity.

However, these problems are exemplary, and the scope of the disclosure is not limited thereto.

Additional aspects will be set forth in part in the description which follows and, in part, will be apparent from the description, or may be learned by practice of the presented embodiments of the disclosure.

A welding guiding system according to an embodiment of the disclosure may include a display unit including a front surface portion corresponding to a welding direction and a rear surface portion corresponding to a face portion direction; at least one eyepiece display installed in an area of the rear surface portion of the display unit; at least one camera unit installed in an area of the front surface portion of the display unit and configured to obtain a plurality of welding image frames according to a photographing condition of each frame; and a processor configured to control the photographing condition of the at least one camera unit, obtain a first synthesized image by synthesizing the plurality of welding image frames in parallel based on the plurality of welding image frames, and control the at least one eyepiece display to display the first synthesized image.

In addition, the welding guiding system may further include a first sensor configured to sense welding information, wherein the processor may control the display unit to provide guiding corresponding to the welding information based on the welding information sensed through the first sensor.

In addition, the first sensor may be installed in an area of the front surface portion of the display unit.

In addition, the welding guiding system may further include a welding torch including a second sensor configured to sense welding information, wherein the processor may control the display unit to provide guiding corresponding to the welding information based on the welding information received from the second sensor.

At this time, the welding information may include welding speed information, welding direction information, welding temperature information, and distance information between a welding base material and the welding torch.

At this time, the at least one camera unit may include a light-shading cartridge installed on a front surface of a camera lens and having a changeable light-shading degree, the first sensor may obtain welding light information by sensing welding light, and the processor may control the at least one camera unit and the light-shading cartridge to maintain the same photographing condition for each frame, change the light-shading degree of the light-shading cartridge based on the welding light information, and obtain the plurality of welding image frames.

In addition, the at least one camera unit may further include a first camera and a second camera, the processor may control a photographing condition of each of the first camera and the second camera.

In addition, the processor may control the first camera and the second camera such that a photographing condition for each frame of the first camera is different from a photographing condition for each frame of the second camera, and may obtain the first synthesized image by synthesizing each frame based on a plurality of first welding images obtained through the first camera and a plurality of second welding images obtained through the second camera.

In addition, the at least one eyepiece display may include a first eyepiece display and a second eyepiece display, the processor may control the first eyepiece display to display an image obtained by the first camera and control the second eyepiece display to display an image obtained by the second camera.

In addition, the processor may obtain a second synthesized image by synthesizing the plurality of first welding images in parallel based on the plurality of first welding images, obtain a third synthesized image by synthesizing the plurality of second welding images in parallel based on the plurality of second welding images, and control the display unit to display the second synthesized image on the first eyepiece display and display the third synthesized image on the second eyepiece display.

The photographing condition may include a shutter speed, ISO sensitivity and a gain.

Other aspects, features, and advantages other than those described above will become apparent from the following detailed description, claims and drawings implementing the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
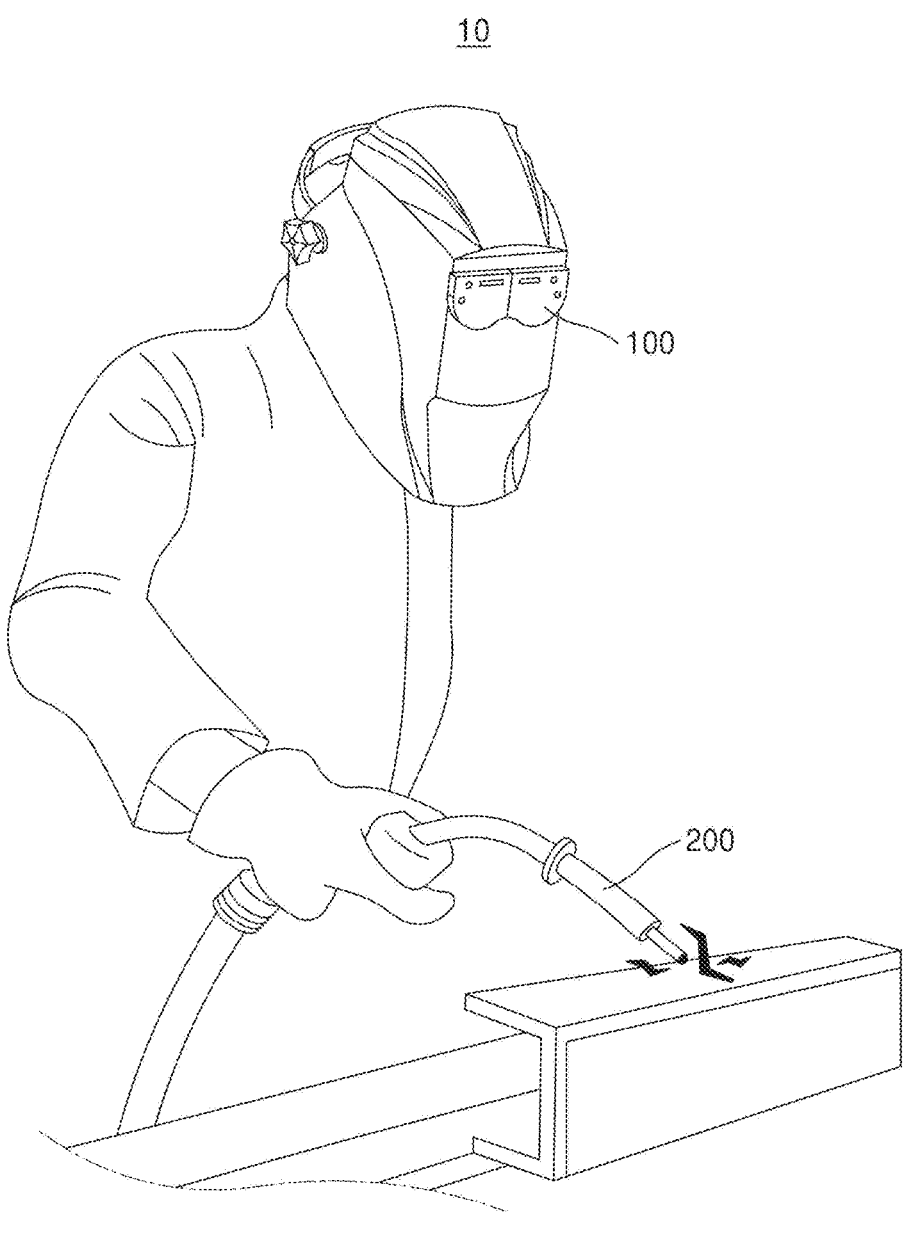
FIG. 1 is a diagram of a structure of a welding system according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure will be described with reference to accompanying drawings. As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope are encompassed in the disclosure. In the description of the drawings, like reference numerals in the drawings denote like elements.

In various embodiments of the disclosure, it is to be understood that the expressions such as "including" and "may include" are intended to indicate the existence of corresponding functions, actions, components, or the like disclosed in the disclosure, and are not intended to limit additional one or more functions, actions, components, or the like. In addition, in various embodiments of the disclosure, it is to be understood that the terms such as "including" "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In various embodiments of the disclosure, it will be understood that although the terms "first," "second," etc. may be used herein to describe various components, these components should not be limited by these terms. For example, the above terms do not limit the order and/or importance of the components. These components are only used to distinguish one component from another. For example, a first user device and a second user device are both user devices and represents user devices different from each other. For example, a first component maybe referred to as a second component, and similarly, a second component may be referred to as a first component, without departing from the scope as defined by the claims of the various embodiments of the disclosure.

It will be understood that when a component is referred to as being "connected to" or "mounted on" another component, the component may be directly connected to or in direct contact with the another component or intervening components may be present therebetween. On the other hand, it will be understood that when a component is referred to as being "directly connected to" or "directly mounted on" another component, intervening components may not present therebetween.

In an embodiment of the disclosure, the terms such as "unit", "part", or the like are terms used to refer to a component configured to perform at least one function or operation, these components may be implemented in hardware or software, or a combination of hardware and software. In addition, except a case where a plurality of "units", "parts", or the like each is required to be implemented in individual particular hardware, the plurality of "units", "parts", or the like may be integrated into at least one module or chip and implemented in at least one processor.

Terms such as those defined in a commonly used dictionary should be interpreted as having meanings consistent with meanings in the context of related technologies, and are not to be interpreted as ideal or excessively formal meanings unless explicitly defined in various embodiments of the disclosure.

Hereinafter, various embodiments of the disclosure will be described in detail with reference to the accompanying drawings.

FIG. 1 is a diagram of a structure of a welding system 10 according to an embodiment of the disclosure.

Referring to FIG. 1, the welding system 10 of the disclosure may include a welding information providing device 100 and a welding torch 200. The welding information providing device 100 and the welding torch 200 may be connected to each other through a communication network to transmit and receive data. The welding information providing device 100 and the welding torch 200 may be matched one-to-one to operate, but are not limited thereto. The welding information providing device 100 and the welding torch 200 may be matched one-to-n to operate. In other words, n welding torches 200 may be connected to one welding information providing device 100 to function, and one welding torch 200 may be connected to n welding information providing devices 100 to function. In addition, the welding information providing device 100 and the welding torch 200 may communicate with separate servers (not shown) to exchange data.

The welding information providing device 100 may provide, to an operator, information with respect to a welding situation. In particular, the welding information providing device 100 may obtain welding images obtained by using at least one camera unit installed on the welding information providing device 100, and generate a synthesized image based on the obtained welding images to display the synthesized image to the operator. At this time, the welding information providing device 100 may generate the synthesized image by using high dynamic range (HDR) technology, and display and provide a high-quality synthesized image to the operator. In this case, the operator may, through the high-quality synthesized image, visually check information with respect to a shape of a welding bead and a surrounding environment other than portions adjacent to welding light.

The welding information providing device 100 according to an embodiment of the disclosure may obtain images through two or more camera units and display each image through at least one display unit to provide a high-quality welding image. At this time, the welding information providing device 100 may synthesize images by differently setting a shutter speed, ISO sensitivity, and a gain value of each camera to photograph repeatedly. The welding information providing device 100 according to an embodiment of the disclosure may improve image quality through performing a contrast ratio process on an obtained synthesized image.

In addition, the welding information providing device 100 may provide a function of displaying welding information in a preferred color (for example, green, blue) by using red, green, and blue (RGB). Furthermore, the welding information providing device 100 of the disclosure may provide a magnifier power correction function (for example, enlargement and reduction of a screen). In addition, the welding information providing device 100 of the disclosure may provide a temperature-synthesized image by using a separate thermal imaging camera. At this time, the welding information providing device 100 may display a welding temperature in colors. The welding information providing device 100 of the disclosure may support a function of providing a sound (for example, a guidance alarm) or a guidance voice with respect to all of the functions described above.

The welding torch 200 according to an embodiment of the disclosure may detect, through at least one sensor, a welding situation including a welding temperature, a welding direction, a welding slope, a welding speed, a distance between a base material and a welding torch with respect to a real-time welding operation. The welding torch 200 may monitor a state of the welding torch and change a set value of a welding torch operation according to the welding situation.

The welding information providing device 100 of the disclosure may receive information with respect to an operation setting and an operation state from the welding torch 200 through a communication network connected to the welding torch 200, and provide, through visual feedback, operation information to the operator based on the received welding information.

For example, when the welding information providing device 100 receives sensing information with respect to a welding temperature value, a notification corresponding to the welding temperature value may be output in various methods such as light, vibration, message, or the like. At this time, the notification may be visual feedback provided in a display unit or a display of the welding information providing device 100, and may be audible feedback through a sound (for example, a guidance alarm) or a guidance voice.

The sensing information with respect to the welding temperature value may include information on whether a welding temperature exceeds a preset temperature range. In addition, the sensing information with respect to the welding temperature value may include a numerical value, a grade, a level, or the like corresponding to a temperature value of a welding surface.

When the welding information providing device 100 according to an embodiment of the disclosure determines that temperature values of the welding torch and the welding surface exceed a preset temperature range, the welding information providing device 100 may guide the operator to stop the operation. When a temperature value of the welding exceeds the preset temperature range, image quality may be deteriorated. Accordingly, the welding information providing device 100 may guide the operator to adjust the temperature value of the torch.

When a current or a voltage state of the welding torch 200 is detected as abnormal, the welding information providing device 100 according to an embodiment of the disclosure may provide visual feedback for warning.

At this time, the visual feedback may provide an icon indicating danger on a portion of an area of the display unit of the welding information providing device 100 displaying an operation site. As another example, the welding information providing device 100 may provide an operation suspension guiding through visual feedback by repeatedly increasing and decreasing a chroma with respect to a particular color (for example, red) on an entire screen of the display unit.

According to an embodiment of the disclosure, the welding information providing device 100 may sense welding information through at least one sensor (for example, a second sensor) included in the welding torch 200 and as well as a sensor (for example, a first sensor) included in the welding information providing device 100. At this time, the welding information providing device 100 may detect, through at least one sensor, a welding situation including a light intensity, a welding temperature, a welding direction, a welding slope, a welding speed, a distance between a base material and a welding torch with respect to a real-time welding operation.

The welding torch 200 may be configured to include at least one device among all types of sensing devices which are capable of detecting a state change. For example, the welding torch 200 may be configured to include at least one sensor among various sensing devices such as an acceleration sensor, a gyro sensor, an illuminance sensor, a proximity sensor, a pressure sensor, a noise sensor, a video sensor, and/or a gravity sensor. A light intensity in a welding operation area detected through the illuminance sensor of the welding torch 200 may be transmitted to a first processor 150 through a communication unit, and the first processor 150 may control a lighting unit and/or a camera unit 110 based on a degree of light transmitted through the illuminance sensor of the welding torch 200, without passing through a sensor unit 140 of the welding information providing device 100.

The acceleration sensor is a component configured to detect a movement of the welding torch 200. In detail, because the acceleration sensor may measure a dynamic force of acceleration, vibration, shock, or the like of the welding torch 200, the movement of the welding torch 200 may be measured.

The gravity sensor is a component configured to detect a direction of gravity. That is, a detection result of the gravity sensor may be used to determine the movement of the welding torch 200 together with the acceleration sensor. In addition, a direction in which the welding torch 200 is gripped may be determined through the gravity sensor.

In addition to the above-described types of sensors, the welding torch 200 may further include various types of sensors, such as a gyroscope sensor, a geomagnetic sensor, an ultrasonic sensor, and a radio-frequency (RF) sensor, and may sense various changes related to a welding operation environment.

Similarly, the welding information providing device 100 may provide guiding corresponding to welding information based on the welding information detected through a sensor (for example, the first sensor) included in the welding information providing device 100.

According to an embodiment of the disclosure, the welding information providing device 100 may change a movement of a welding torch by sensing a movement of a certain user or a voice of the preset user after the guiding for operation suspension is provided.

In another embodiment, when the communication with the welding torch 200 is not smooth, the welding information providing device 100 may obtain the temperature values of the welding torch and the welding surface through image sensing provided therein. For example, the welding information providing device 100 may obtain the temperature values of the welding torch and the welding surface based on the image data obtained through the thermal imaging camera.

The above-described embodiment only describes a case in which information received from the welding torch 200 is welding temperature information, and the welding information providing device 100 may provide various guiding with respect to various welding information.

Figure 2:
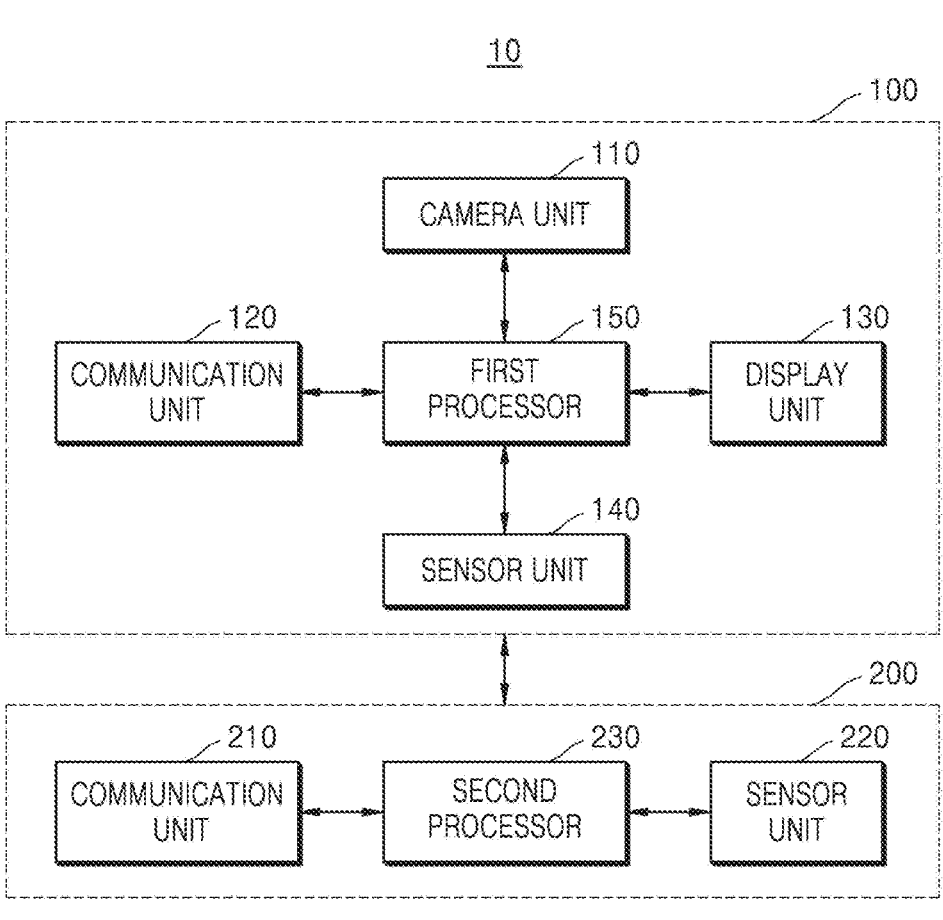
FIG. 2 is a schematic block diagram of components of a welding system according to an embodiment of the disclosure.

FIG. 2 is a schematic block diagram of components of the welding system 10 according to an embodiment of the disclosure.

Referring to FIG. 2, the welding information providing device 100 of the welding system 10 may include at least one camera unit 110, a communication unit 120, a display unit 130, and a sensor unit 140, and the welding torch 200 of the welding system 10 may include a communication unit 210, a sensor unit 220, and a second processor 230.

The camera unit 110 may include at least one camera device, and is configured to obtain an image with respect to a welding operation site. The camera unit 110 according to an embodiment of the disclosure may be a camera positioned adjacent to the display unit 130 of the welding information providing device 100. For example, a first camera and a second camera of the camera unit 110 may be each symmetrically installed on one area of a front surface portion of the display unit 130 of the welding information providing device 100.

The camera unit 110 may receive a control command from the first processor 150 and change a setting of shutter speed, ISO sensitivity, gain, or the like in response to the control command to photograph the welding operation site. When the camera unit 110 includes a plurality of configurations, the first camera and the second camera according to an embodiment of the disclosure may each photograph the welding operation site through different photographing settings.

The camera unit 110 according to an embodiment of the disclosure may be included in the one area of the front surface portion of the display unit 130, and may be a structure in which a light-shading cartridge is positioned in front of a lens receiving light from an object.

An automatic light-shading cartridge may block welding light generated when an operator performs a welding operation. In other words, the automatic light-shading cartridge (not shown) may increase a degree of shading light of the cartridge by blackening based on welding light information detected through the sensor unit 140, for example, a photo sensor. At this time, the automatic light-shading cartridge may include, for example, a liquid crystal display (LCD) panel in which a degree of blackening may be adjusted according to an alignment direction of the liquid crystal. However, the automatic light-shading cartridge is not limited thereto, and may be implemented in various panels such as a vertical-align (VA) type of LCD, a twist nematic (TN) type of LCD, an in-plane switching (IPS) type of LCD, or the like.

The degree of blackening of the automatic light-shading cartridge may be automatically adjusted according to the brightness of the welding light. As described above, when the degree of blackening is automatically adjusted according to the brightness of the welding light, the sensor unit 140 may be used. For example, when the sensor unit 140 senses a light intensity of the welding light to obtain welding light information, and transmits, as an electrical signal, information with respect to the light intensity of the welding light included in welding light information to the first processor 150 to be described below, the first processor 150 may control the degree of blackening based on the light intensity of the welding light.

That is, the automatic light-shading cartridge (not shown) may change a light-shading degree of the panel in real time to correspond to a light intensity of light generated from the welding surface at the welding operation site, and the camera unit 110 may obtain a welding image in which a certain amount of welding light is shaded by the automatic light-shading cartridge installed in the front surface portion of the display unit 130.

According to an embodiment of the disclosure, the welding information providing device 100 may not include the automatic light-shading cartridge. In this case, a user may perform a welding operation only with welding images obtained through the camera unit 110.

The camera unit 110 according to an embodiment of the disclosure may include a thermal imaging camera. The welding information providing device 100 may obtain a temperature image by synthesizing a thermal imaging image obtained through the thermal imaging camera to an image of the welding operation site.

The communication unit 120 is configured to receive welding information from the welding torch 200 and transmit a command to control the welding torch 200. According to an embodiment of the disclosure, the communication unit 120 may transmit a synthesized image to an external device other than the welding torch 200. At this time, the external device may include various devices including a communication module such as a smartphone, a computer, or the like of an operator/third party.

The communication unit 120 may be configured to perform communication with various types of external devices according to various types of communication methods. The communication unit 120 may include at least one of a Wi-Fi chip, a Bluetooth chip, a wireless communication chip, and a near field communication (NFC) chip. In particular, in a case where a Wi-Fi chip or a Bluetooth chip is used, various types of connection information such as a service set identifier (SSID), a session key, or the like may be first transmitted and received, and various types of information may be transmitted and received after performing a communication connection by using the various types of connection information. The wireless communication chip refers to a chip that performs communication according to various communication standards such as Institute of Electrical and Electronics Engineers (IEEE), Zigbee, 3rd Generation (3G), 3rd Generation Partnership Project (3GPP), Long term Evolution (LTE), or the like. The NFC chip refers to a chip that operates in an NFC method using a 13.56 MHz band among various radio frequency identification (RFID) frequency bands such as 135 kHz, 13.56 MHz, 433 MHz, 860 MHz to 960 MHz, 2.45 GHz, or the like.

The display unit 130 is configured to provide high-quality synthesized images to operators. In particular, the display unit 130 may be implemented in a form of goggle glasses including a display which displays a synthesized image obtained by synthesizing images obtained through the camera unit 110.

According to an embodiment of the disclosure, a back surface portion of the display unit 130, that is, a portion facing the operator, may include a display configured to display high-quality images to the operator and eyepiece lenses and an eyepiece portion configured to allow an operator to view the display.

The display included in the display unit 130 may display high-quality synthesized images such that the operator may visually check a surrounding environment (for example, a shape of a previously welded bead or the like) other than a portion adjacent to the welding light. In addition, the display unit 130 may guide, to the operator, visual feedback (for example, a welding progress direction) with respect to a state of performing welding.

The display included in the display unit 130 may be implemented by various display technologies, such as a liquid crystal display (LCD), an organic light-emitting diode (OLED) display, an active-matrix organic light-emitting diode (AM-OLED) display, a liquid crystal in silicon (LcoS) display, a digital light processing (DLP) display, or the like. At this time, the display according to an embodiment of the disclosure is implemented as a panel of an opaque material, and the operator may not be directly exposed to harmful light. However, the display is not limited thereto and may be implemented as a transparent display.

The sensor unit 140 may include a plurality of sensor modules configured to sense various information with respect to a welding site and obtain welding information. At this time, the welding information may include a welding temperature, a welding direction, a welding slope, a welding speed, and a distance between a base material and a welding torch with respect to a real-time operation. Moreover, the sensor unit 140 may include an optical sensor module configured to detect a degree of light at least in a welding operation area.

According to an embodiment of the disclosure, the sensor unit 140 may include an illuminance sensor. At this time, the sensor unit 140 may obtain information with respect to a light intensity of the welding light of the welding site. In addition to the illuminance sensor, the sensor unit 140 may further include various types of sensors such as a proximity sensor, a noise sensor, a video sensor, an ultrasonic sensor, an RF sensor, or the like, and may sense various changes related to a welding operation environment.

The first processor 150 may generate a high-quality synthesized image by synthesizing welding images received through the camera unit 110. The first processor 150 may differently set photographing conditions for each frame of the camera unit 110 and obtain a synthesized image by synthesizing frames obtained in chronological order in parallel. In detail, the first processor 150 may control the camera unit 110 to photograph by changing the shutter speed, the ISO sensitivity, the gain, or the like of the camera unit 110.

At this time, the first processor 150 may differently set a photographing condition according to conditions such as welding light, ambient light, and a degree of movement of the welding torch 200 of a sensed welding site. In detail, the first processor 150 may set the photographing condition to reduce the ISO sensitivity and gain as the welding light and/or ambient light of the welding site increases. In addition, when the movement and/or operation speed of the welding torch 200 is sensed as fast, the photographing condition may be set to increase the shutter speed.

The first processor 150 may synthesize images of a preset number of frames in parallel. According to an embodiment of the disclosure, each image in the preset frames may be obtained under photographing conditions different from each other.

When two or more camera units 110 are provided, the first processor 150 according to an embodiment of the disclosure may control the camera units 110 to photograph by differently setting photographing setting conditions of each camera. In the case, the first processor 150 may also synthesize images of the preset frames in parallel.

The first processor 150 may control an overall operation of the welding information providing device 100 by using various programs stored in a memory (not shown). For example, the first processor 150 may include a central processing unit (CPU), random access memory (RAM), read-only memory (ROM), and a system bus. Herein, the ROM is a configuration in which a set of instructions booting a system is stored, and the CPU copies an operating system in a memory of the welding information providing device 100 into the RAM according to the instructions stored in the ROM, and executes an O/S to boot the system. When the booting is completed, the CPU may perform various operations by copying and executing various applications stored in the memory to RAM. In the above description, the first processor 150 is described as including only one CPU, but may be implemented as a plurality of CPUs (or a digital signal processor (DSP), a system on chip (SoC), or the like) in an embodiment.

According to an embodiment of the disclosure, the first processor 150 may be implemented as the DSP, a microprocessor, and/or a time controller TCON. However, the first processor 150 is not limited thereto, and may include one or more of the CPU, a micro controller unit (MCU), a controller, an application processor (AP), a communication processor (CP), or an advanced RISC machine (ARM) processor, or may be defined by corresponding terms. In addition, the first processor 150 may be implemented as the SoC and a large scale integration (LSI) in which a processing algorithm is embedded, or may be implemented in a form of a field programmable gate array (FPGA).

The welding torch 200 may include the communication unit 210, the sensor unit 220, and the second processor 230.

The communication unit 210 may transmit and receive data to and from the welding information providing device 100. The communication unit 210 may include a module capable of short-range wireless communication (for example, Bluetooth, Wi-Fi, and Wi-Fi Direct), long-range wireless communication (3G, high-speed downlink packet access (HSDPA), or LTE).

The sensor unit 220 or the second sensor is included in the welding torch 200 and is configured to sense a welding situation, such as a welding temperature, a welding speed, a welding slope, a welding direction, and a distance between a base material and a welding torch.

The sensor unit 220 may detect at least one of various changes such as a posture change of a user gripping the welding torch 200, a change in an illumination intensity of the welding surface, a change in the acceleration of the welding torch 200, or the like, and may transmit a corresponding electrical signal to the second processor 230. In other words, the sensor unit 220 may sense a state change based on the welding torch 200 and generate a corresponding detection signal to transmit the detection signal to the second processor 230.

In the disclosure, the sensor unit 220 may include various sensors, and according to a control when the welding torch 200 is driven (or based on a user setting), power is supplied to at least one preset sensor to sense a state change of the welding torch 200.

In this case, the sensor unit 220 may be configured to include at least one device among all types of sensing devices which are capable of detecting a state change. For example, the sensor unit 220 may be configured to include at least one sensor among various sensing devices such as an acceleration sensor, a gyro sensor, an illuminance sensor, a proximity sensor, a pressure sensor, a noise sensor, a video sensor, a gravity sensor, or the like. A light intensity in a welding operation area detected through the illuminance sensor of the welding torch 200 may be transmitted to the first processor 150 through the communication unit 210, and the first processor 150 may control a lighting unit 112 and/or the camera unit 110 based on a degree of light transmitted through the illuminance sensor of the welding torch 200, without passing through the sensor unit 140 of the welding information providing device 100.

The acceleration sensor is a component configured to detect a movement of the welding torch 200. In detail, because the acceleration sensor may measure a dynamic force of acceleration, vibration, shock, or the like of the welding torch 200, the movement of the welding torch 200 may be measured.

The gravity sensor is a component configured to detect a direction of gravity. That is, a detection result of the gravity sensor may be used together with the acceleration sensor to determine the movement of the welding torch 200. In addition, a direction in which the welding torch 200 is gripped may be determined through the gravity sensor.

In addition to the above-described types of sensors, the welding torch 200 may further include various types of sensors, such as a gyroscope sensor, a geomagnetic sensor, an ultrasonic sensor, and a RF sensor, and may sense various changes related to a welding operation environment.

Figure 3A:
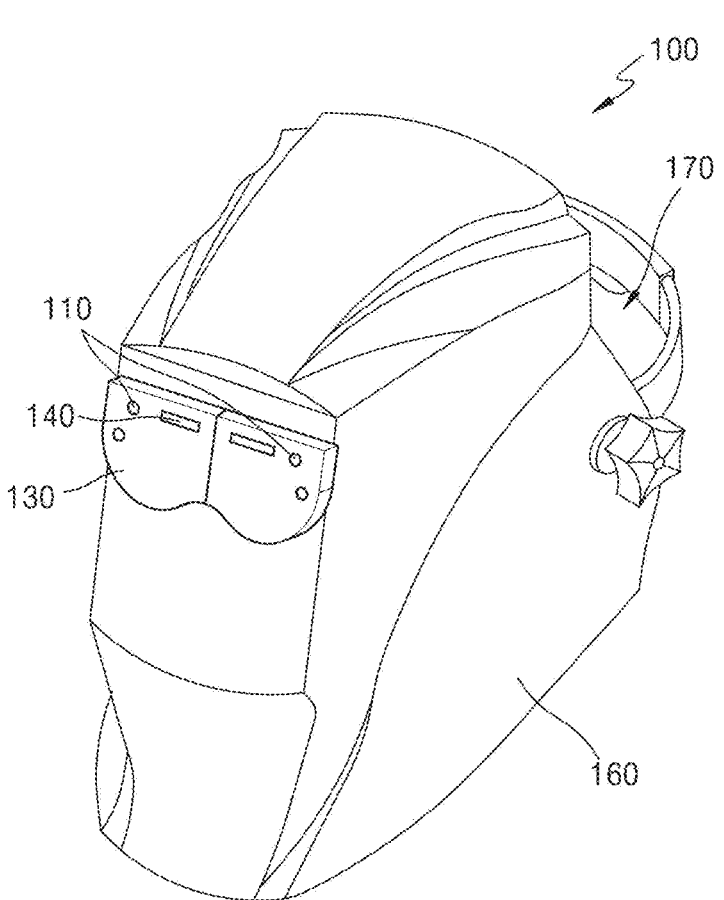
FIGS. 3A and 3B are perspective views each illustrating a welding information providing device equipped with a plurality of cameras according to embodiments different from each other of the disclosure.
Figure 3B:
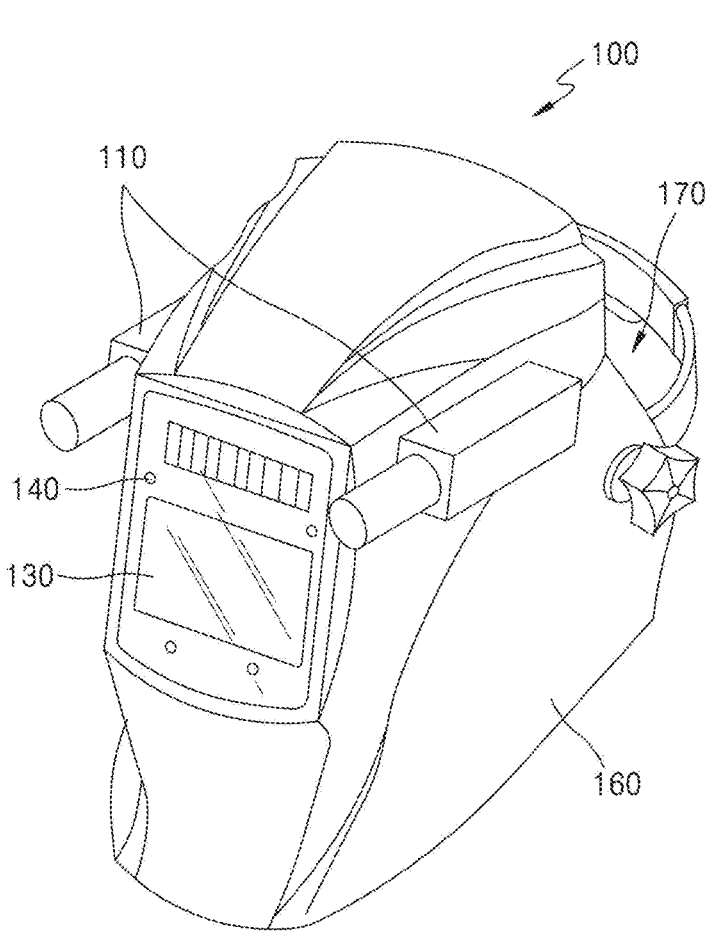

FIGS. 3A to 3B are schematic diagrams of the welding information providing device 100 according to an embodiment of the disclosure. FIGS. 3A and 3B are perspective views each illustrating the welding information providing device 100 equipped with a plurality of camera units 110 according to embodiments different from each other of the disclosure.

Referring to FIG. 3A, the welding information providing device 100 of the disclosure may include a main body 160, a display unit 130 installed on a front surface of the main body 160, at least one camera unit 110 installed in an area of a front surface portion of the main body 160, at least one sensor unit 140, and a fixing portion 170 arranged on a rear surface of the main body 160 and fixing the welding information providing device 100 to the head portion of an operator.

According to an embodiment, a plurality of camera units 110 may be included. In particular, when two camera units 110 are included, the two camera units 110 may be symmetrically installed in an area of the front surface portion of the display unit 130. At this time, the front surface portion of the display unit 130 may be an external area (an area illustrated in FIG. 3A) corresponding to a direction in which a welding operation is performed. On the other hand, the rear surface portion of the display unit 130 may be an internal area corresponding to a face direction of the operator.

Although at least one sensor unit 140 (or the first sensor) is illustrated as being installed in an area of the front surface portion of the display unit 130 in FIG. 3A, the sensor unit 140 may be included in the main body 160, according to an embodiment of the disclosure. At this time, the sensor unit 140 may be installed in a front surface direction of the main body 160 such that the sensor unit 140 may sense a welding situation.

The main body 160 protecting the operators face may include a material having a certain strength, for example, reinforced plastic or the like, but the disclosure is not limited thereto. Various materials may be used as long as the materials are resistant to elements such as sparks that may occur during welding.

The fixing portion 170 is a configuration that directly contacts the head portion of the operator, and at least a portion of a side surface of the fixing portion 170, that is, at least a portion of an inner surface of the fixing portion 170, which directly contacts the head portion of the operator, may include a soft material such as a fiber material or a cushion material.

Referring to FIG. 3B, the main body 160 protecting the face of the operator of the disclosure may include the display unit 130 and the sensor unit 140 installed on the front surface of the main body 160. In addition, at least one camera unit 110 may be symmetrically installed on both side surfaces of the main body 160. In addition, the welding information providing device 100 may include the fixing portion 170 arranged on the rear surface of the main body 160 and fixing the welding information providing device 100 to the head portion of the operator.

In particular, the camera unit 110 may be implemented as two cameras, and may be respectively installed on both side surfaces of the main body 160 in a direction corresponding to an operation direction of the operator. Although not illustrated in FIGS. 3A and 3B, when the camera unit 110 is an odd number, the camera unit 110 may be installed on a central upper end of the main body 160.

The rear surface portion of the display unit 130 of the disclosure may display a synthesized welding image to the operator in a direction of a face portion of the operator. In addition, the rear surface portion of the display unit 130 may display a user interface (UI) with respect to a current state such as a battery state of the welding information providing device 100 when a certain event occurs.

Although at least one sensor unit 140 (or the first sensor) is illustrated as being installed in an area of the front surface portion of the display unit 130 in FIG. 3B, the sensor unit 140 may be included in the main body 160, according to an embodiment of the disclosure. According to another embodiment, the sensor unit 140 may be included and installed on at least a portion of the at least one camera unit 110.

Figure 4A:
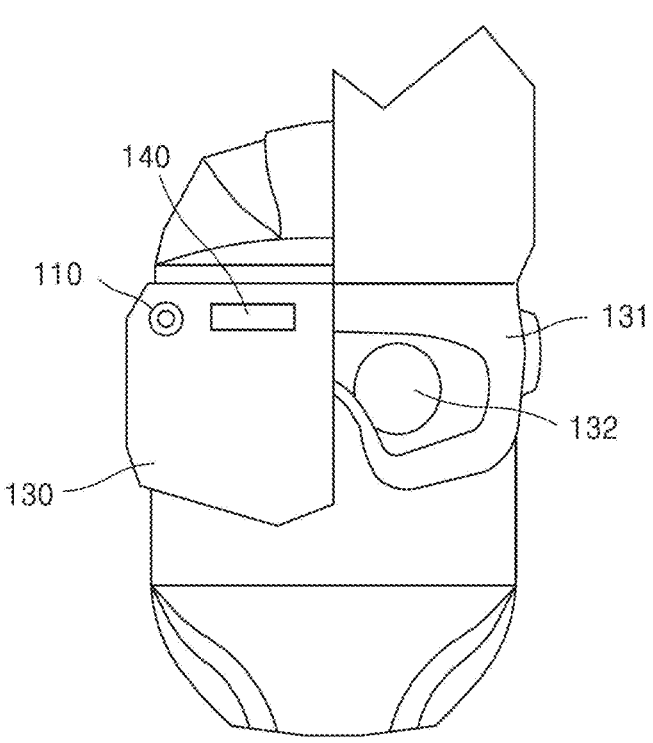
FIGS. 4A and 4B are diagrams illustrating a portion of a welding information providing device according to another embodiment of the disclosure.
Figure 4B:
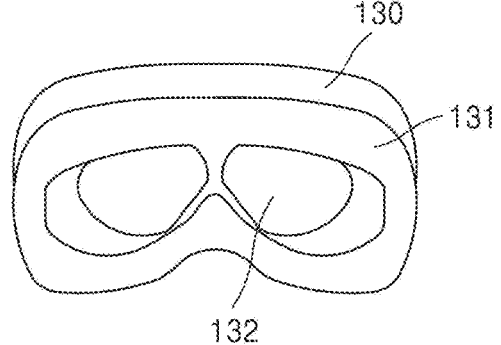

FIGS. 4A and 4B are diagrams of the welding information providing device 100 according to an embodiment of the disclosure.

Referring to FIG. 4A, the display unit 130 of the welding information providing device 100 may be implemented in a form of a head mounted display (HMD). The display unit 130 may be implemented as a structure capable of arbitrarily opening a portion corresponding to one-side eye or both-side eyes.

According to another embodiment, the display unit 130 may be equipped with the camera unit 110 and the sensor unit 140. The camera unit 110 and the sensor unit 140 may be installed in an area of the front surface portion of the display unit 130. At this time, the front surface portion of the display unit 130 may mean an area corresponding to a direction in which a welding operation is performed, and the rear surface portion of the display unit 130 may mean an area corresponding to the direction of the face portion of the operator and corresponding to a direction displaying a welding image.

Referring to FIG. 4A, the display unit 130 according to an embodiment of the disclosure may include four camera units 110 and two sensor units 140. According to an embodiment, some of the four camera units 110 may be thermal imaging cameras. The four camera units 110 may be installed in an area of the front surface portion of the display unit 130 by two to correspond to each eye. In this case, multi-angle images may be obtained to provide three-dimensional images with high quality to operators.

According to an embodiment of the disclosure, the first processor 150 may be installed adjacent to the display unit 130. In other words, the display unit 130 may synthesize, in the first processor 150, images obtained by using the camera unit 110 and the sensor unit 140 to display the synthesized image to a user. In this case, the display unit 130 may be used in a form detachable from the main body 160.

According to an embodiment of the disclosure, the at least one sensor unit 140 may be installed in an area of the front surface portion of the display unit 130 to correspond to each eye. As another example, the sensor unit 140 may be included in the main body 160, and the sensor unit 140 may be installed in the front surface direction of the main body 160 to sense a welding situation.

FIG. 4B is a diagram of the rear surface portion of the display unit 130 according to an embodiment of the disclosure. Referring to FIG. 4B, the display unit 130 may be separated from the welding information providing device 100 and implemented as a separate configuration. The rear surface portion of the display unit 130 may include an eyepiece part 131 and an eyepiece display 132. The eyepiece part 131 may be fixed by being in close contact with the face of an operator. The operator may allow both eyes portions to be in close contact with the eyepiece parts 131 and view a high-quality synthesized image displayed on the eyepiece display 132. In another embodiment, the eyepiece parts 131 may each include a lens unit, and the lens unit may magnify a high-quality synthesized image implemented on the eyepiece display 132 such that the high-quality synthesized image is easily formed on the eyes of a user.

According to an embodiment of the disclosure, the display unit 130 may display, on the eyepiece display 132 corresponding to each eye, an image synthesized based on images obtained by the camera unit 110 corresponding to each eye.

For example, when the first camera installed in an area corresponding to the left eye obtains an image under a first photographing condition, the display unit 130 may display a first synthesized image synthesized based on the first photographing condition on the first eyepiece display 132 included in the area corresponding to the left eye among the rear surface portion of the display unit 130. Similarly, when the second camera installed in an area corresponding to the right eye obtains an image under a second photographing condition, the display unit 130 may display a second synthesized image synthesized based on the second photographing condition on the second eyepiece display 132 included in the area corresponding to the right eye among the rear surface portion of the display unit 130.

As described above, compared to displaying the same synthesized image in both eyes, a flexible synthesized image with a three-dimensional effect may be provided. However, this is only an example. Each eyepiece display 132 may display the same synthesized image even when the camera units 110 corresponding to each eyepiece display 132 photographs under different conditions.

The structure of the display unit 130 as described above is not limited to that shown in FIGS. 4A and 4B, a transparent screen member may be arranged in front of the eyes and may have a structure in which an image is projected onto the screen member. In this case, an automatic light-shading cartridge is provided at the front of the screen member to block welding light generated when an operator welds.

In the case of the above-described embodiments, the main body 160 is a structure wrapping a user's head portion to a certain extent, but the disclosure is not limited thereto. The main body 160 may be a structure provided to only cover the face of a user, or may include various structures that may be worn by the user in a form of goggles or glasses.

In addition, in the above-described embodiment, the camera unit 110 is shown as including two cameras, but the disclosure is not limited thereto, and the disclosure may be applied the same to a camera unit including one camera.

Figure 5:
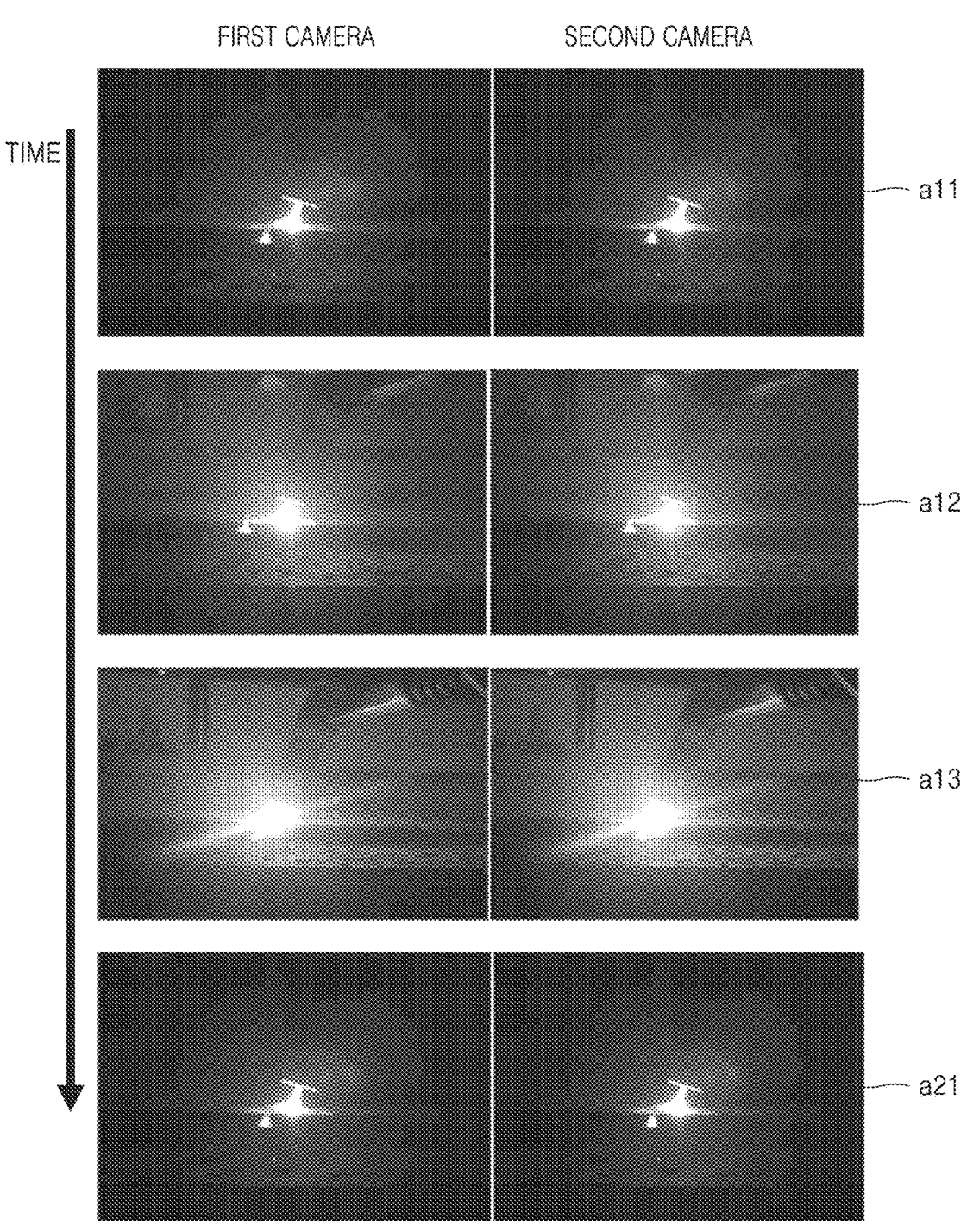
FIG. 5 is a diagram explaining a camera according to an embodiment obtaining an image.

FIG. 5 is a diagram explaining a camera according to an embodiment obtaining an image.

FIG. 5 illustrates an embodiment in which the camera unit 110 of the disclosure includes two cameras. Referring to FIG. 5, a first camera and a second camera of the camera unit 110 may change the photographing conditions in a chronological order and photograph a welding site. At this time, the photographing conditions may include the ISO sensitivity, the gain, and/or the shutter speed.

A first frame a11 and a fifth frame a21 are photographed under the first photographing condition, a second frame a12 is photographed under the second photographing condition, and a third frame a13 is photographed under a third photographing condition. Although not illustrated in FIG. 5, a fourth frame may be further included, in this case, the fourth frame may be photographed under a fourth photographing condition. In the present embodiment, the first camera and the second camera are shown as photographing the same frame under the same photographing condition.

For example, the first photographing condition may be, as compared with the second photographing condition, photographed with a fast shutter speed and a setting with high sensitivity and gain, and the third photographing condition may be, as compared with the second condition, a setting of a slow shutter speed, a low sensitivity, and a low gain. However, the above-described embodiment is only an example, and the camera unit 110 may obtain an image under various photographing conditions.

Figure 6A:
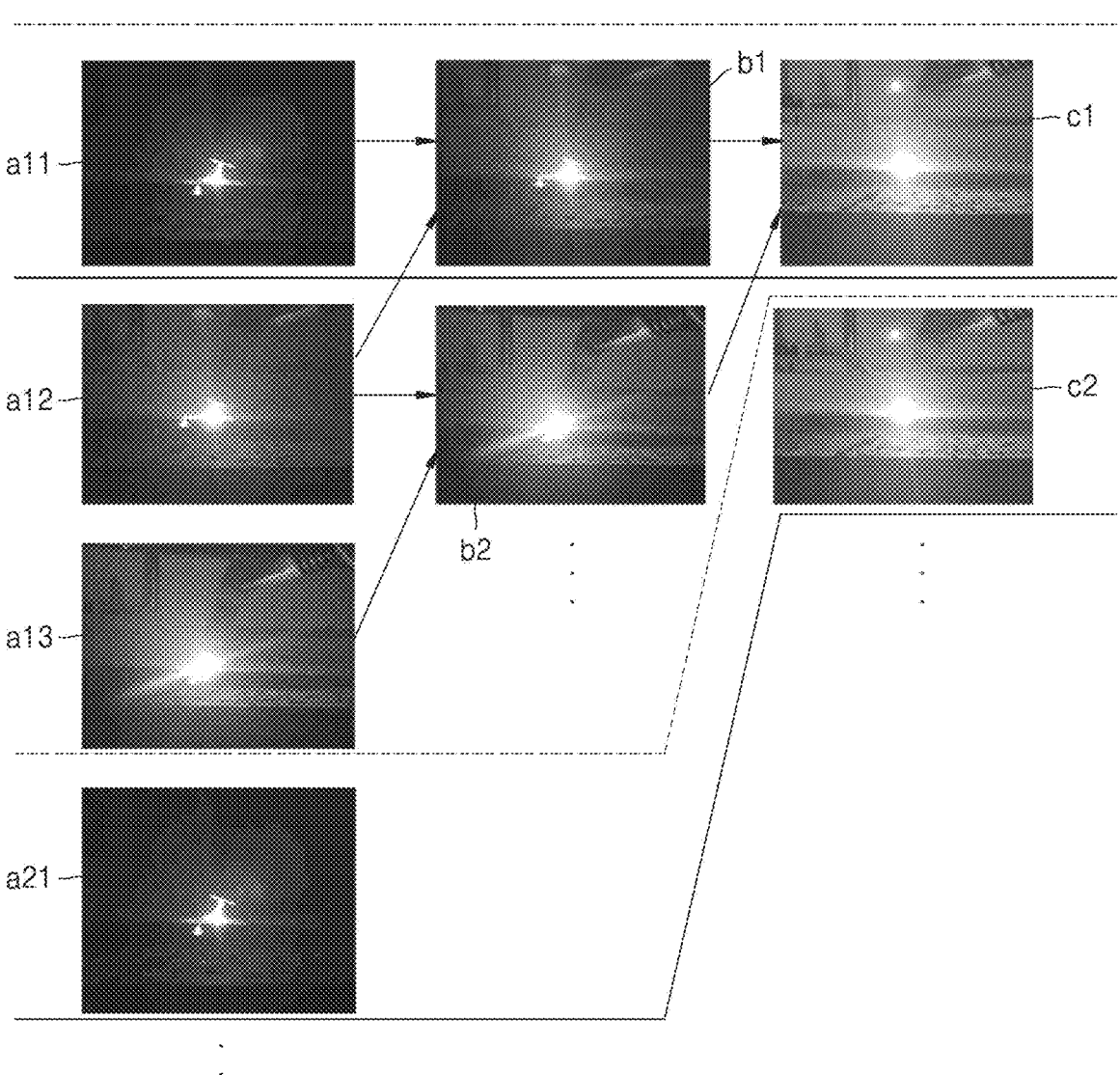
FIGS. 6A and 6B are diagrams explaining a processor according to an embodiment synthesizing images obtained as in FIG. 5 and improving image quality of a synthesized image.
Figure 6B:
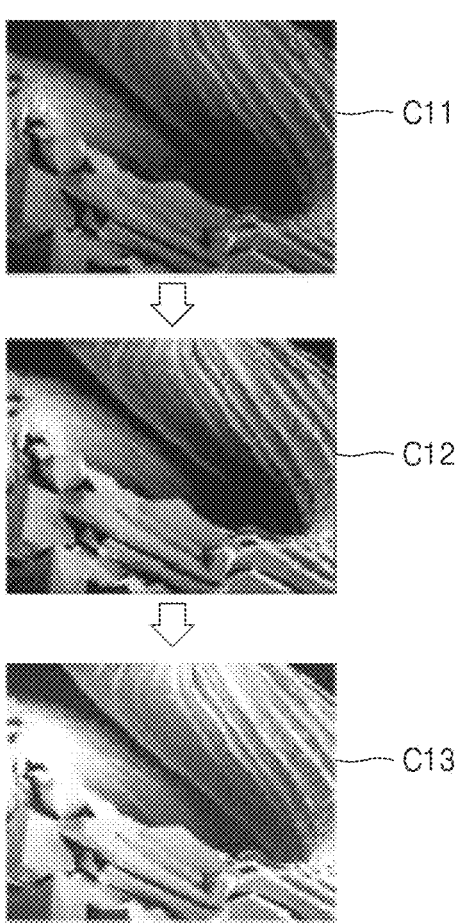

FIGS. 6A and 6B are diagrams explaining a processor according to an embodiment synthesizing images obtained as in FIG. 5 and improving image quality of the synthesized image.

The first processor 150 according to an embodiment of the disclosure may synthesize an image based on a preset number of frames. At this time, the number of frames for one synthesized image may be set by an operator or may be set at the factory.

The first processor 150 of FIG. 6A may generate a welding image, which is a synthesized image, based on the number of three frames. In particular, the first processor 150 may obtain a first intermediate synthesized image b1 by synthesizing the first frame a11 and the second frame a12. In addition, the first processor 150 may obtain a second intermediate synthesized image b2 by synthesizing the second frame a12 and the third frame a13.

The first processor 150 may obtain a first synthesized image c1 by synthesizing the first intermediate synthesized image b1 and the second intermediate synthesized image b2.

Similarly, the first processor 150 may synthesize a third intermediate synthesized image (not shown) by synthesizing the third frame a13 and a fourth frame (not shown), and may obtain a second synthesized image c2 by synthesizing the second intermediate synthesized image b2 and the third intermediate synthesized image (not shown).

As described above, according to the disclosure, a high-quality synthesized image may be obtained by synthesizing images taken through various photographing conditions in a HDR method. An operator may easily identify a surrounding portion other than an adjacent portion of a welding light spot through the above-described high-quality synthesized image. In other words, in the related art, because the brightness of the welding light is overwhelmingly brighter than the surrounding portion, the shape of a pre-operated welding bead and an environment surrounding the welding are unable to be easily identified, but according to the welding system 10, even a beginner operator may easily identify the welding bead and the environment surrounding the welding through a high-quality image.

The first processor 150 may perform the first synthesized image c1 and the second synthesized image c2 in parallel. According to an embodiment of the disclosure, the first processor 150 may obtain a plurality of synthesized images at the same speed as the speed at which the frames are photographed through the camera unit 110, by performing parallel image synthesis with a difference of one frame.

FIG. 6B is a diagram illustrating that a processor according to an embodiment of the disclosure performs a contrast ratio processing on a synthesized image.

Referring to FIG. 6B, the first processor 150 may perform a contrast ratio processing on an obtained synthesized image. For example, the first processor 150 may perform an additional contrast or shadow rate processing on an obtained first synthesized image c11 to obtain a second synthesized image c12 and a third synthesized image c13.

As described above, a shadow rate may be increased through the additional contrast ratio processing on a synthesized image, and a light state of a welding visor may be clearly identified.

Figure 7:
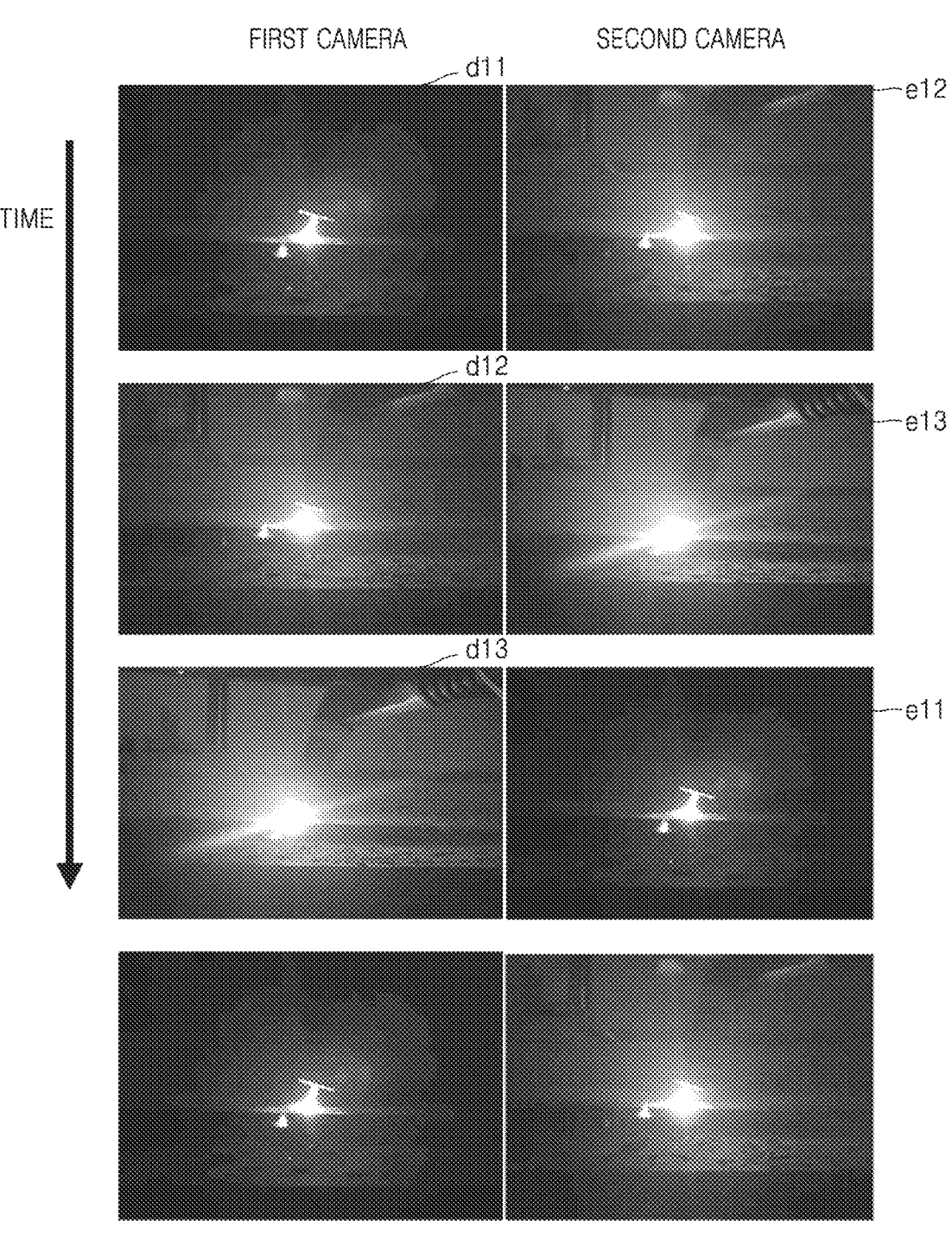
FIG. 7 is a diagram explaining a plurality of cameras according to another embodiment obtaining an image.

FIG. 7 is a diagram explaining a plurality of cameras according to another embodiment obtaining images.

Referring to FIG. 7, a first camera and a second camera may photograph a welding situation under different photographing conditions in a frame of the same time.

For example, a first frame d11 of the first camera and a third frame e11 of the second camera may be photographed under the first photographing condition. A second frame d12 of the first camera and a first frame e12 of the second camera may be photographed under the second photographing condition, a third frame d13 of the first camera and a second frame e13 of the second camera may be photographed under the third photographing condition. In other words, in the present embodiment, the first camera and the second camera are shown as photographing under different photographing conditions in the same frame.

For example, the first photographing condition may be, as compared with the second photographing condition, photographed with a fast shutter speed and a setting with high sensitivity and gain, and the third photographing condition may be, as compared with the second condition, a setting of a slow shutter speed, a low sensitivity, and a low gain. However, the above-described embodiment is only an example, and the camera unit 110 may obtain an image under various photographing conditions.

Figure 8:
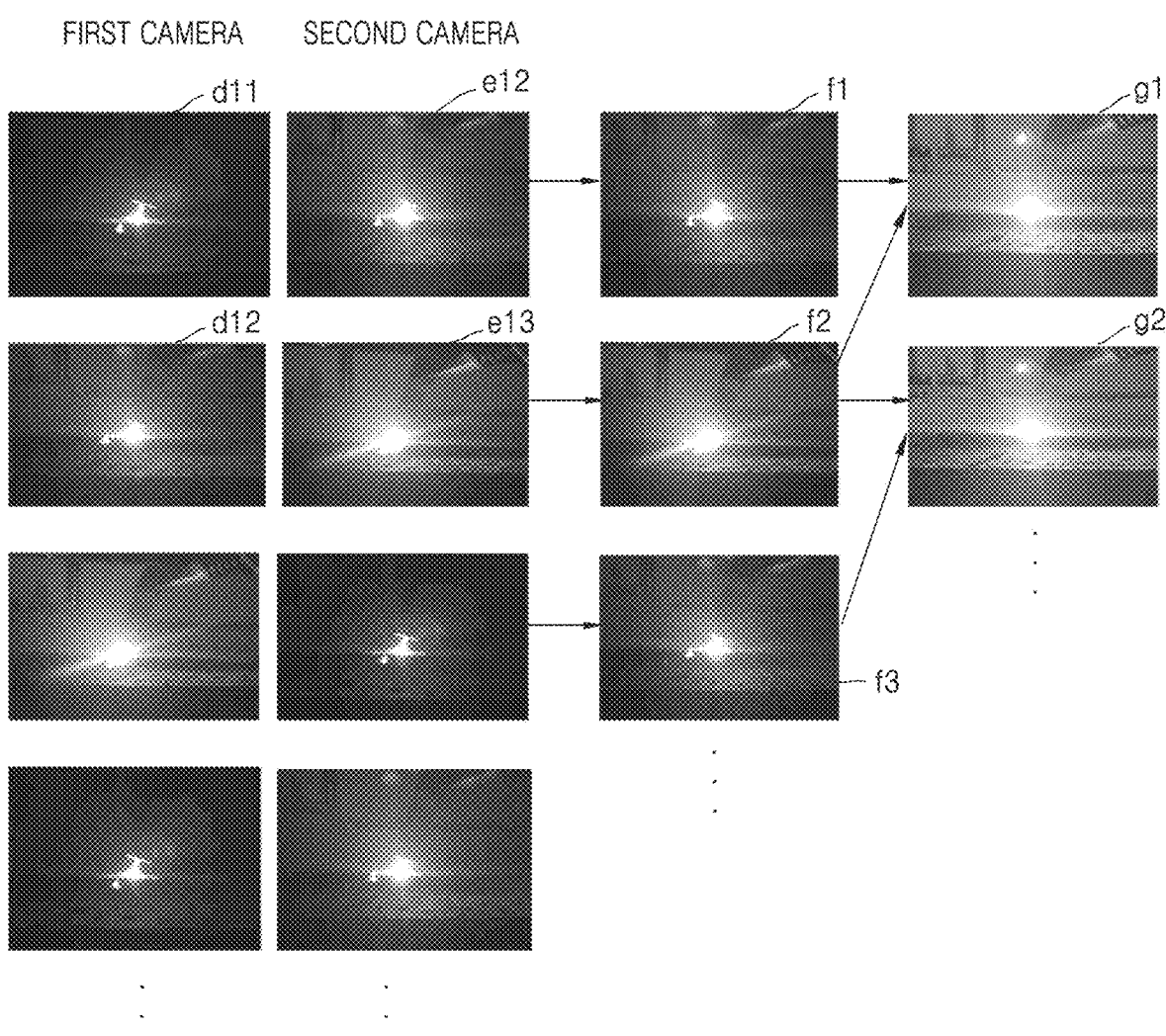
FIG. 8 is a diagram explaining a method of synthesizing obtained images obtained in FIG. 7.

FIG. 8 is a diagram explaining a method of synthesizing obtained images obtained in FIG. 7.

Referring to FIG. 8, the first processor 150 may obtain a first intermediate synthesized image f1 by synthesizing the first frame d11 of the first camera with the first frame e12 of the second camera. In addition, the first processor 150 may obtain a second intermediate synthesized image f2 by synthesizing the second frame d12 of the first camera with the second frame e13 of the second camera.

The first processor 150 may generate a first synthesized image g1 by synthesizing the first intermediate synthesized image f1 with the second intermediate synthesized image f2. Similarly, the first processor 150 may obtain a second synthesized image g2 by synthesizing the second intermediate synthesized image f2 with a third intermediate synthesized image f3. The first processor 150 may obtain a third synthesized image (not shown) by the same method.

As described above, according to the disclosure, the welding light in a welding image may be easily identified by synthesizing images obtained through various photographing conditions in the HDR method.

The first processor 150 may perform the first synthesized image g1 and the second synthesized image g2 in parallel. According to the disclosure, the first processor 150 may obtain a plurality of synthesized images at the same speed as the speed at which the frames are photographed through the camera unit 110, by performing image synthesis in parallel at the same time that the first camera and the second camera photograph the frame.

According to an embodiment of the disclosure, the first processor 150 may display the synthesized image only on one side of the display unit 130 including a binocular display. For example, a synthesized image obtained by synthesizing images obtained through the first camera in a method of FIG. 6A may be displayed on a display on a side of the eyepiece display 132, the side corresponding to the first camera. A synthesized image synthesized in a method of FIG. 8 may be displayed on a display on a side of the eyepiece display 132, the side corresponding to the second camera. Accordingly, a three-dimensional effect may be provided by providing a welding image in which the welding light of the welding surface is corrected in the HDR method to only one display of the eyepiece display 132.

It is described with respect to FIGS. 5 to 8 that a photographing condition of the camera unit 110 is changed for each frame to obtain a welding site image or a welding image frame. However, according to another embodiment, the first processor 150 of the disclosure may change the light-shading degree of the automatic light-shading cartridge based on sensing information with respect to an intensity of the welding light obtained through the sensor unit 140. At this time, when the camera unit 110 is located inside the automatic light-shading cartridge, a welding image frame may be obtained by changing the light-shading degree of the automatic light-shading cartridge installed in the front surface portion of the camera.

In this case, the first processor 150 may, while maintaining the same photographing condition of the camera unit 110, change the light-shading degree to obtain the frames a22 to a13, a21, d11 to d13, e11 to e13, or the like in which the shadow rate as shown in FIGS. 5 to 8 presents.

Figure 9:
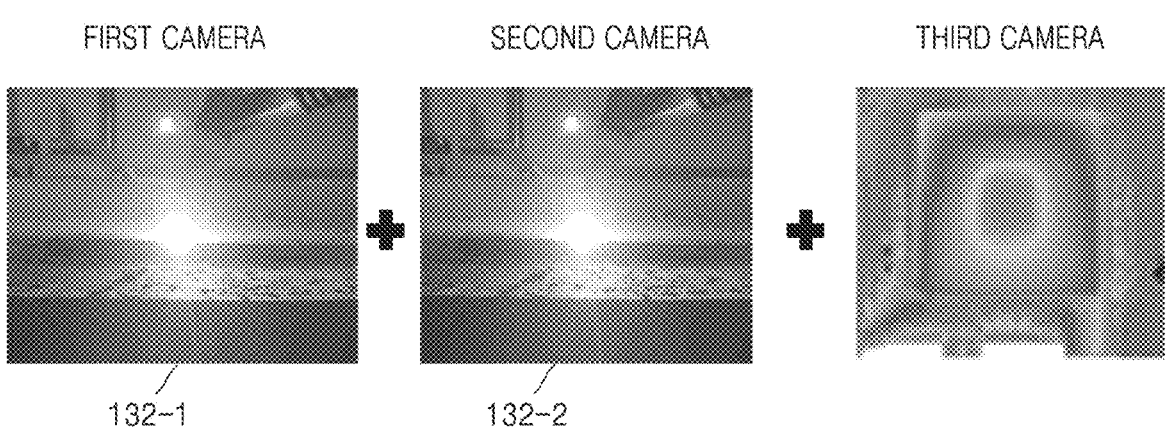
FIG. 9 is a diagram explaining a method of providing an image to a display unit according to another embodiment.

FIG. 9 is a diagram explaining a method of providing a welding image on the display unit 130 according to another embodiment.

Referring to FIG. 9, the camera unit 110 according to an embodiment may include a first camera, a second camera, and a third camera. The display unit 130 may include a first eyepiece display 132-1 and a second eyepiece display 132-2. A this time, the first camera may be a camera corresponding to the first eyepiece display 132-1, the second camera may be a camera corresponding to the second eyepiece display 132-2, and the third camera may be a thermal imaging camera.

The first eyepiece display 132-1 and the second eyepiece display 132-2 of the embodiment may display a high-quality synthesized image to which the HDR technique is applied based on images obtained by the first camera and the second camera.

According to an embodiment, the first processor 150 may obtain a thermal imaging synthesized image obtained by further synthesizing a thermal imaging image obtained by the third camera to the high-quality synthesized image. The first eyepiece display 132-1 and the second eyepiece display 132-2 may each display a thermal imaging synthesized image. At this time, the first eyepiece display 132-1 and the second eyepiece display 132-2 may provide visual information with respect to a welding temperature by using colors.

According to an embodiment, the first eyepiece display 132-1 may display different images. For example, an image to which the HDR technique is not applied may be displayed on the first eyepiece display 132-1, and a synthesized image to which the HDR technique is applied may be displayed on the second eyepiece display 132-2. Even in this case, the first processor 150 may synthesize a thermal imaging image on each of the image to which the HDR technique is not applied and the synthesized image to which the HDR technique is applied, and the first eyepiece display 132-1 and the second eyepiece display 132-2 may control the display unit 130 to each display the image to which the HDR technique is not applied and the synthesized image to which the HDR technique is applied.

Figure 10:
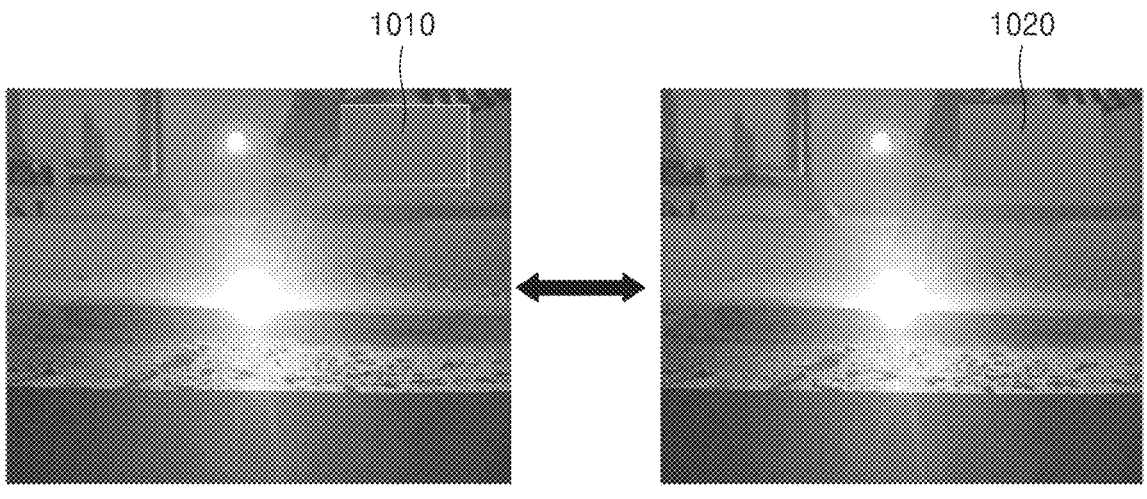
FIG. 10 is a diagram of an embodiment in which welding information is displayed according to another embodiment.

FIG. 10 is a diagram of an embodiment in which welding information is displayed according to another embodiment.

The first processor 150 according to an embodiment may provide feedback with respect to a state of a welding current and/or voltage in a welding power cable based on welding information sensed from the welding torch 200. In particular, referring to FIG. 10, the first processor 150 may provide a UI with respect to a current state to a portion of an image screen displayed on the display unit 130. At this time, the UI may display information in a predetermined color using RGB.

For example, when the current and/or voltage state of the welding torch 200 is sensed as abnormal, the welding information providing device 100 according to an embodiment may display a red UI 1010 as visual feedback for warning, and in other cases, the welding information providing device 100 may display a green UI 1020.

In addition to the current state, the first processor 150 may provide feedback with respect to various welding information. For example, as shown in FIGS. 11A and 11B, the welding information providing device 100 may guide the UI with respect to a welding direction of a torch through visual feedback.

Figure 11A:
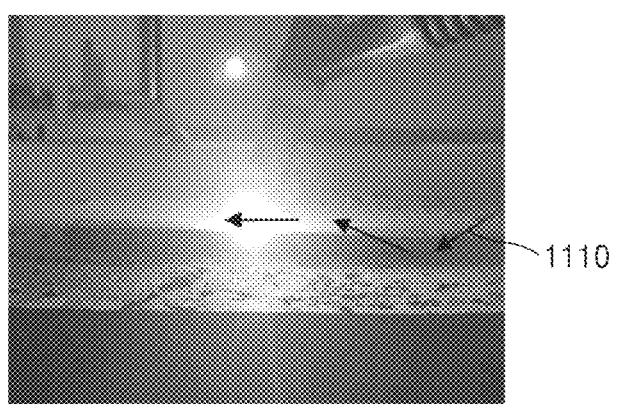
FIGS. 11A and 11B are diagrams explaining a welding information providing device guiding a user interface (UI) with respect to a welding direction of a welding torch through visual feedback.

Referring to FIG. 11A, the first processor 150 may display information with respect to the welding direction with an arrow UI 1110. In particular, the first processor 150 may display and provide, to an operator, a straight line arrow for each welding direction which is operated in a straight line, based on information sensed through the acceleration sensor included in the welding torch 200.

Figure 11B:
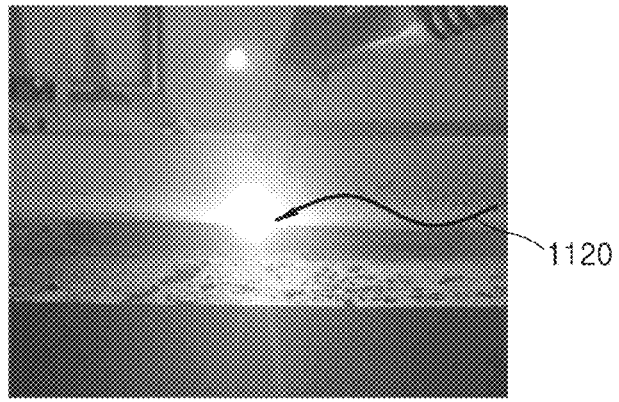

Alternatively, referring to FIG. 11B, the first processor 150 may display information with respect to a welding direction with the curved arrow UI 1010. In particular, based on the information sensed through the acceleration sensor included in the welding torch 200, the first processor 150 may form a pre-operated welding direction into a curved arrow to display the same on the display unit 130, thereby providing the curved arrow to the operator.

However, this is only an example. The first processor 150 may display a corresponding UI in a partial area of the display unit 130 based on sensing information, sensed through at least one sensor unit 220 included in the welding torch 200, including a welding temperature, a welding slope, a welding speed, a distance between a base material and a welding torch, or the like with respect to a real-time welding operation.

For example, when sensing information with respect to a welding temperature value is received, the first processor 150 may display the UI corresponding to the welding temperature value in various methods, such as light, vibration, message, or the like. At this time, the UI may be visual feedback displayed on the display unit 130 or a partial area of a display, and may be audible feedback through voice.

The sensing information with respect to the welding temperature value may include whether the temperature of a base material exceeds a preset temperature range. In addition, the sensing information with respect to the welding temperature value may include a numerical value, a grade, a level, or the like corresponding to the welding temperature value of the welding surface.

When a temperature value of the base material is determined as exceeding the preset temperature range, the first processor 150 according to an embodiment may guide an operator to stop an operation. When the temperature value of the base material exceeds the preset temperature range, a risk of deterioration in quality may be included, and thus an operator may be guided to adjust the temperature value of a welding base material.

As another example, when sensing information with respect to a welding speed value is received, the first processor 150 may display a UI corresponding to the value. At this time, the UI may be visual feedback provided to the display unit 130 or a display, and may be audible feedback through voice.

When the welding speed of a welding torch is determined as exceeding a normal range, the first processor 150 may guide the operator to stop an operation through visual feedback. At this time, the visual feedback may be providing an icon indicating danger to a partial area of the display unit 130 displaying an operation site.

As another example, the first processor 150 may provide a UI such that an operator may easily identify a shape corresponding to a pre-operated welding bead. In particular, when the shape of the welding bead is sensed, the first processor 150 may overlap and display a UI with respect to the shape of the welding bead on a high-quality synthesized image.

At this time, the shape of the welding bead may be obtained by sensing a residual temperature of a base material after a welding operation through a thermal imaging camera included in the welding information providing device 100. This is only an example, and the welding information providing device 100 may obtain the shape of the welding bead through various methods.

Figure 12:
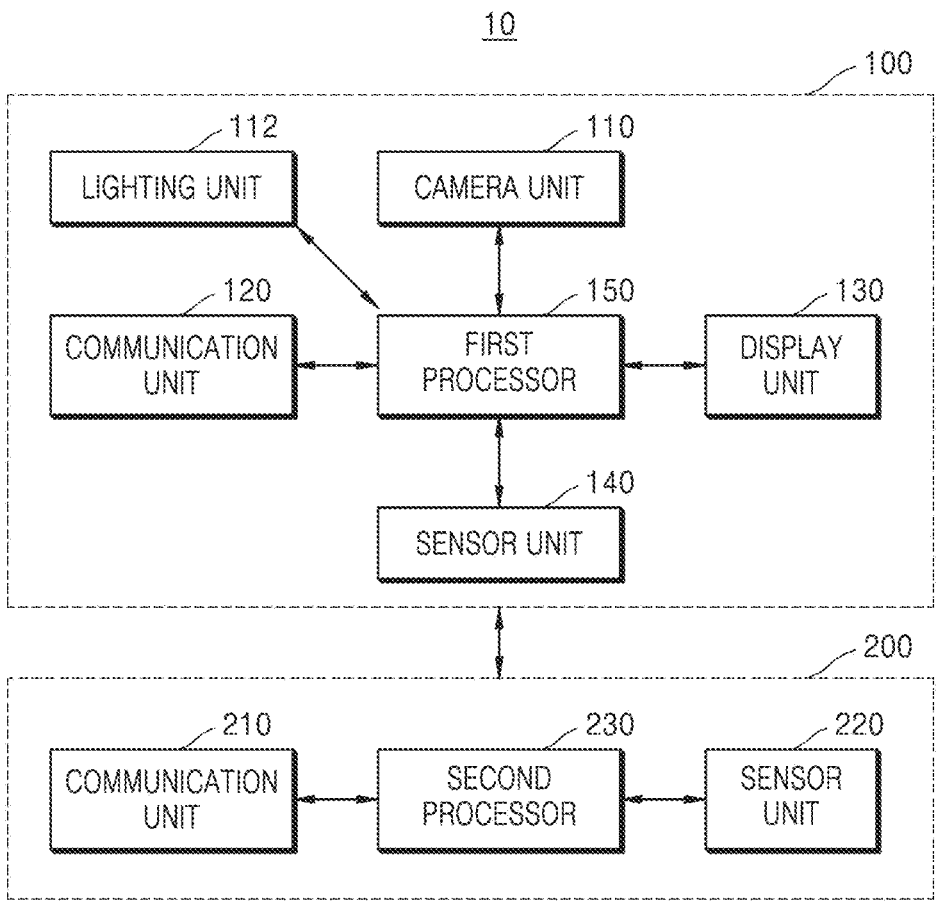
FIG. 12 is a schematic block diagram of components of a welding system according to another embodiment of the disclosure.
Figure 13A:
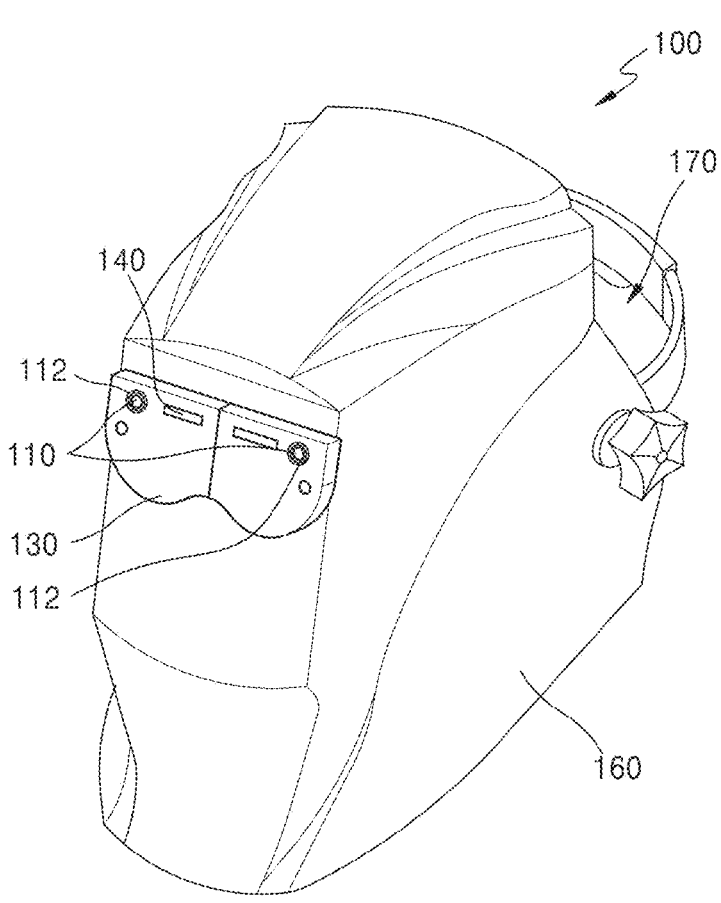
FIGS. 13A and 13B are perspective views illustrating a welding information providing device equipped with a plurality of cameras according to embodiments different from each other of the disclosure.
Figure 13B:
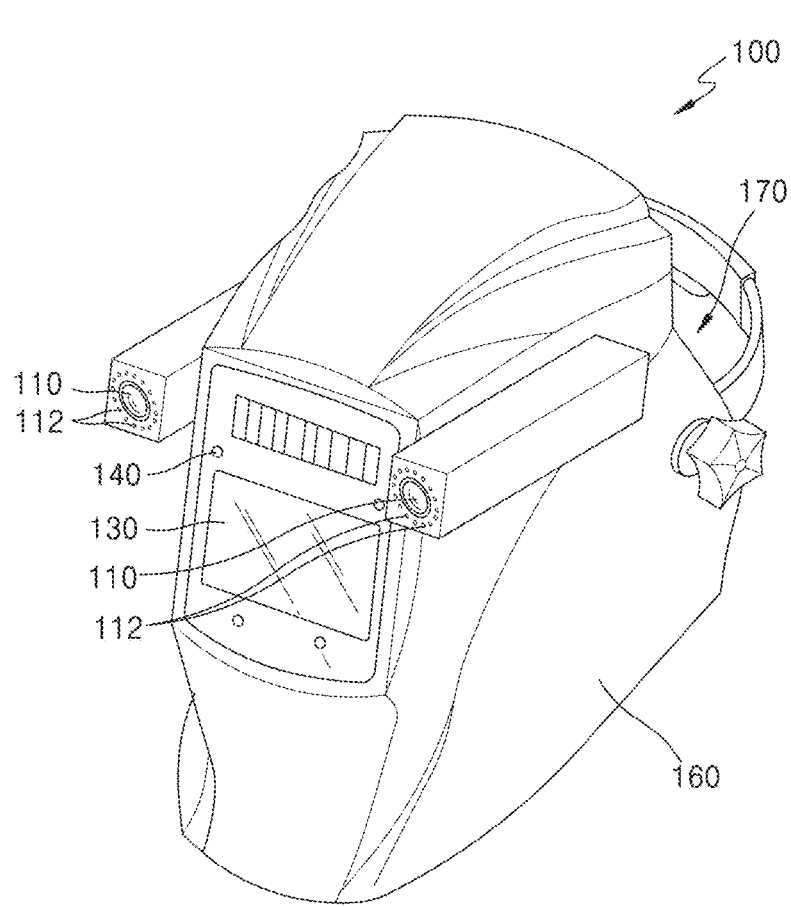

FIG. 12 is a schematic block diagram of components of the welding system 10 according to another embodiment of the disclosure. FIGS. 13A and 13B are perspective views illustrating the welding information providing device 100 equipped with a plurality of camera units 110 according to embodiments different from each other of the disclosure.

An embodiment illustrated in FIG. 12 may further include the lighting unit 112 in addition to the embodiment illustrated in FIG. 2. Hereinafter, differences from the above-described embodiment will be mainly described below.

According to the embodiment shown in FIG. 12, the lighting unit 112 electrically connected to the first processor 150 may be further included. The lighting unit 112 is located outside the welding information providing device 100 and is configured to irradiate light toward at least a welding operation area. The lighting unit 112 may include a plurality of LED modules, and an output level of light emitted through the lighting unit 112 may be controlled under a control of the first processor 150. According to an embodiment, the lighting unit 112 may operate in conjunction with an operation of the camera unit 110 under the control of the first processor 150.

Referring to FIGS. 13A and 13B, the lighting unit 112 may be located adjacent to the camera unit 110. In particular, the lighting unit 112 may be provided to illuminate toward a photographing target of the camera unit 110.

According to the embodiment shown in FIG. 13A, the lighting unit 112 may be installed in an area of the front surface portion of the display unit 130.

Referring to FIG. 13B, the lighting unit 112 may be located adjacent to the camera unit 110 provided independently of the display unit 130. In particular, the lighting unit 112 may be provided to illuminate toward a photographing target of the camera unit 110.

Figure 14:
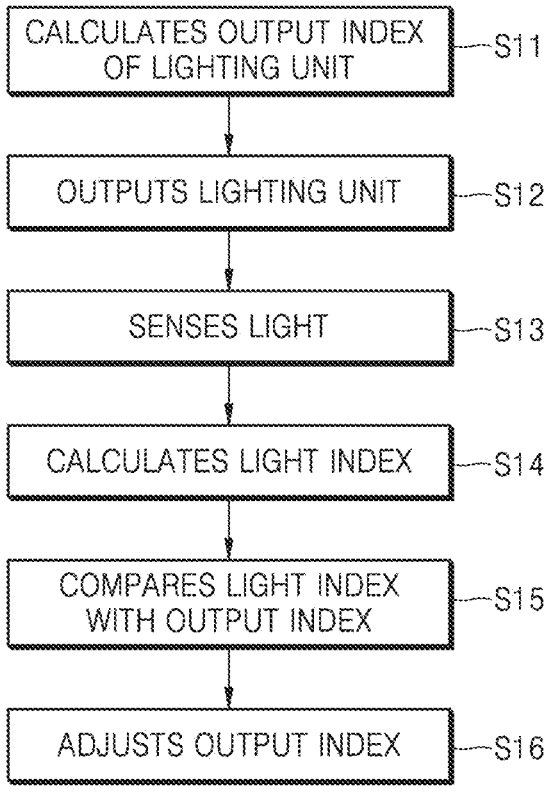
FIG. 14 is a block diagram illustrating a state in which a first processor controls operations of a camera unit and a lighting unit, according to another embodiment.

FIG. 14 is a block diagram illustrating a control method of the camera unit 110 and the lighting unit 112 according to the first processor 150 according to another embodiment.

The first processor 150 according to an embodiment may control at least one of the camera unit 110 and the lighting unit 112 to reflect a degree of light sensed at least in a welding operation area through the sensor unit 140 and/or the sensor unit 220. Accordingly, the first processor 150 may reflect the degree of light sensed through the sensor unit 140 and/or 220 to provide a welding operator with more accurate environment information of a welding operation area.

The first processor 150 according to another embodiment may be configured to adjust an output index of the lighting unit 112 to reflect the degree of light sensed at least in the welding operation area. The output index of the lighting unit 112 is to allow an image generated by the camera unit 110 to be more clearly distinguished. The output index of the lighting unit 112 may be adjusted by the degree of light obtained by the sensor unit 140 and/or the sensor unit 220, such that the welding operator may obtain the environment information of the welding operation area more accurately.

According to the embodiment shown in FIG. 14, in operation S11, the first processor 150 calculates the output index of the lighting unit 112. In operation S12, the first processor 150 outputs the lighting unit 112 according to the calculated output index.

In operation S13, light is sensed by the sensor unit 140 and/or the sensor unit 220, and data sensed is transmitted to the first processor 150. The sensor unit 140 and/or the sensor unit 220 may include an illuminance sensor module. Accordingly, a degree of the sensed light may be at least an illumination intensity of a welding operation area.

In operation S14, the first processor 150 calculates a light index based on received data. In addition, in operation S15, the calculated light index is compared with the output index of the lighting unit 112 described above. Each of the light index and output index corresponds to an index converted into a single unit such that the degree of the sensed light and the output level of light through the lighting unit 112 may be compared with each other. The degree of light and the output level of the lighting unit 112 may be matched with a best combination, which may be calculated in advance and stored in a table.

In operation S16, the first processor 150 may adjust the output index by reflecting a comparison result of the light index and the output index. For example, when the light index is higher than the output index, an optimal lighting condition for the camera unit 110 may be achieved by adjusting the output index of the lighting unit 112 downward to an optimal output index value matching a corresponding light index.

In addition, when the light index is lower than the output index, a lighting environment insufficient for the photographing of the camera unit 110 is additionally supported by further adjusting the output index of the lighting unit 112 upward to the optimal output index value matching a corresponding light index.

Accordingly, according to an embodiment of the disclosure, high-quality image information may be obtained through the camera unit 110 in a welding operation environment, and thus, a welding operator may recognize the welding operation environment more clearly.

Figure 15:
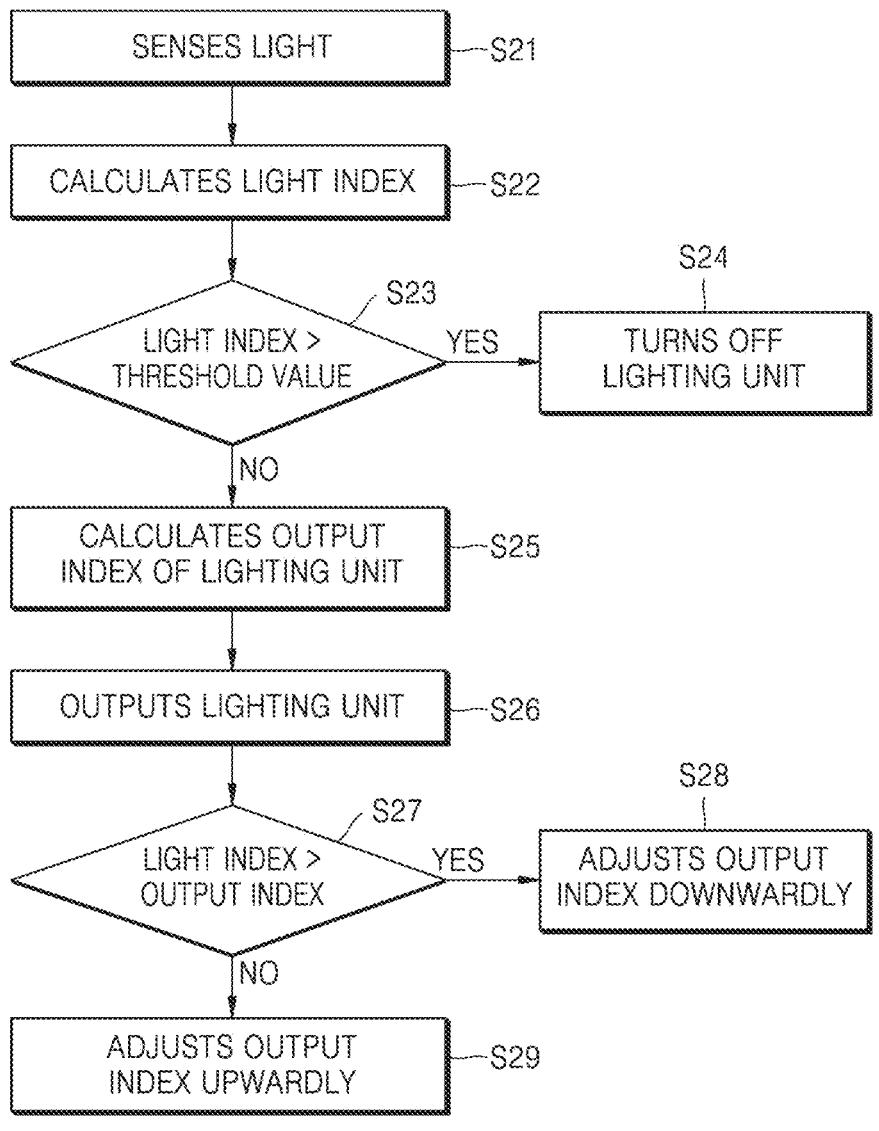
FIG. 15 is a block diagram illustrating a state in which a first processor controls operations of a camera unit and a lighting unit, according to another embodiment.

FIG. 15 is a block diagram illustrating a state in which the first processor 150 controls operations of the camera unit 110 and the lighting unit 112 according to another embodiment.

In operation S21, a degree of light in a welding operation area may be sensed by the sensor unit 140 and/or the sensor unit 220. According to an embodiment, the sensor unit 140 and/or the sensor unit 220 may include an illuminance sensor module. Accordingly, the degree of light may correspond to illuminance data in the welding operation area.

In operation S22, when data with respect to the degree of light is transmitted to the first processor 150, the first processor 150 calculates a light index in the welding operation area based on the data. At this time, the welding operation area may be an area including a portion where welding is performed by the welding torch 200. Herein, as described below, the light index may correspond to data converted to compare the data with respect to the degree of light described above with a particular threshold value and/or output data of the lighting unit 112.

In operation S23, the first processor 150 compares the light index with a preset threshold value. In operation S24, when the light index is greater than the threshold value, the first processor 150 turns off the lighting unit 112. The above-described threshold value may correspond to an illuminance value of light generated in a welding light spot as welding starts. The illuminance value of light generated in the welding light spot may vary depending on a type of welding and/or a state of welding, and the above-described threshold value may be a value corresponding to a type of welding and/or a state of welding that includes the lowest illuminance value. However, the disclosure is not limited thereto. The threshold value may be a plurality of values to respectively correspond to the type of welding and/or the state of welding.

When the light index is greater than the threshold value, which indicates that welding has started, the first processor 150 may turn off the lighting unit 112 such that interference by light of the lighting unit 112 may not be received when the camera unit 110 photographs a portion where a welding operation is performed. In addition, because an intensity of welding light is very large, the light of the lighting unit 112 may be unnecessary light. At this time, unnecessary power consumption in the lighting unit 112 may be minimized by turning off the lighting unit 112.

When the light index is less than the threshold value, which is determined that a welding operation is not performed, the first processor 150 may turn on the lighting unit 112 to allow the camera unit 110 perform smooth photographing.

At this time, in operation S25, an output index of the lighting unit 112 is first calculated, and in operation S26, the lighting unit 112 is output based on the calculated output index.

In operation S27, the first processor 150 again compares the light index with the output index. At this time, when the light index is higher than the output index, an optimal lighting condition for the camera unit 110 may be achieved by adjusting the output index of the lighting unit 112 downward to an optimal output index value matching a corresponding light index in operation S28. In addition, when the light index is lower than the output index, a lighting environment insufficient for the photographing of the camera unit 110 is additionally supported by further adjusting the output index of the lighting unit 112 upward to the optimal output index value matching a corresponding light index in operation S29.

As described above, the welding information providing device according to the disclosure may provide an environment in which an optimal image may be obtained in a state in which unnecessary power waste is reduced by adjusting an output of a lighting unit according to a situation.

Figure 16:
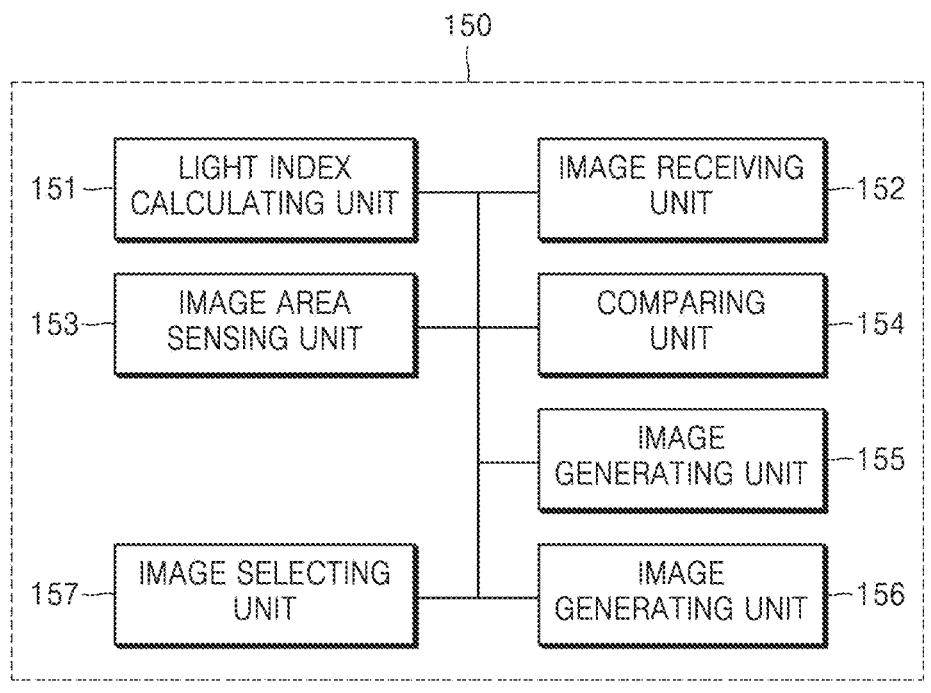
FIG. 16 is a block diagram of another embodiment of a first processor.

FIG. 16 is a block diagram of the first processor 150 according to another embodiment. According to a more particular embodiment shown in FIG. 16, the first processor 150 may include a light index calculating unit 151, an video receiving unit 152, an image area sensing unit 153, a comparing unit 154, an image generating unit 155, an video generating unit 156, and an video selecting unit 157.

The light index calculating unit 151 calculates a light index based on a degree of light with respect to at least a welding operation area sensed by the sensor unit 140. At this time, the welding operation area may be an area including a portion where welding is performed by the welding torch 200. The degree of light may correspond to illuminance data in the welding operation area. The light index may correspond to data converted to compare data of the degree of light with a particular threshold value.

The video receiving unit 152 receives an image generated from the camera unit 110. The video receiving unit 152 has a different meaning from a communication unit and may be a program area of the first processor 150 receiving image data generated from the camera unit 110.

The image area sensing unit 153 senses an image area with respect to a welding operation in a welding image received by the video receiving unit 152. According to an embodiment, the image area sensing unit 153 senses a feature of the image area. The image area sensing unit 153 may detect a pixel having a greater brightness or a pixel having the greatest brightness compared to a surrounding area in the welding image.

The comparing unit 154 compares data such as comparing the light index with a first threshold value, or more particularly, comparing a feature of the image area with a second threshold value.

The image generating unit 155 generates a second image related to the welding operation. The image generating unit 155 may generate a suitable second image by an instruction of the comparing unit 154. However, the disclosure is not limited thereto, and the second image may be stored in advance.

The video generating unit 156 generates a second image processing the received image.

The image selecting unit selects an image to be transmitted to the display unit 130.

Figure 17:
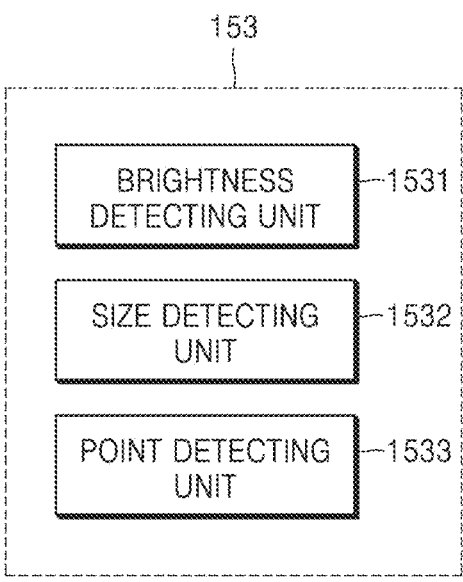
FIG. 17 is a block diagram of an embodiment of an image area sensing unit.

Optionally, according to another embodiment, as shown in FIG. 17, the image area sensing unit 153 may include a brightness detecting unit 1531, a size detecting unit 1532, and a point detecting unit 1533.

The brightness detecting unit 1531 detects the brightness and/or brightness distribution of an image area. The brightness detection of the image area may be performed through an analysis with respect to the brightness of pixels configuring the image area. According to a more particular embodiment, distribution of pixels in a certain brightness range around a pixel having a greater brightness compared to the surrounding area in the image may be detected. Optionally, the brightness detecting unit 1531 may detect the distribution of pixels in a certain brightness range around the pixel having the greatest brightness in the image.

The size detecting unit 1532 detects the size of the image area. The size detection of the image area may be performed through an analysis with respect to distribution of pixels configuring the image area. According to a more particular embodiment, the size of the distribution of pixels in a certain area range around a pixel having the greatest brightness compared to a surrounding area in the image may be detected. Optionally, the size detecting unit 1532 may detect the size of the distribution of pixels in a certain area range around the pixel having the greatest brightness in the image.

The point detecting unit 1533 detects a point of the image area. The point detection of the image area may be performed through an analysis with respect to the location of pixels configuring the image area. According to a more particular embodiment, a point where the distribution of pixels in a certain brightness range around a pixel having the highest brightness compared to a surrounding area in the image is located in the image may be detected. Optionally, the size detecting unit 1532 may detect a point where the distribution of pixels in a certain brightness range around a pixel having the greatest brightness in the image is located in the image.

Although FIG. 17 illustrates an embodiment in which the image area sensing unit 153 includes all of the brightness detecting unit 1531, the size detecting unit 1532, and the point detecting unit 1533, the disclosure is not limited thereto. The image area sensing unit 153 may include at least one of the brightness detecting unit 1531, the size detecting unit 1532, and the point detecting unit 1533.

Each configuration of the first processor 150 described above is not limited to a hardware configuration configuring the first processor 150, and may correspond to a program driving area configuring the first processor 150.

Next, an embodiment of an image display method by the welding information providing device 100 having the above-described configuration will be described in detail below.

Figure 18:
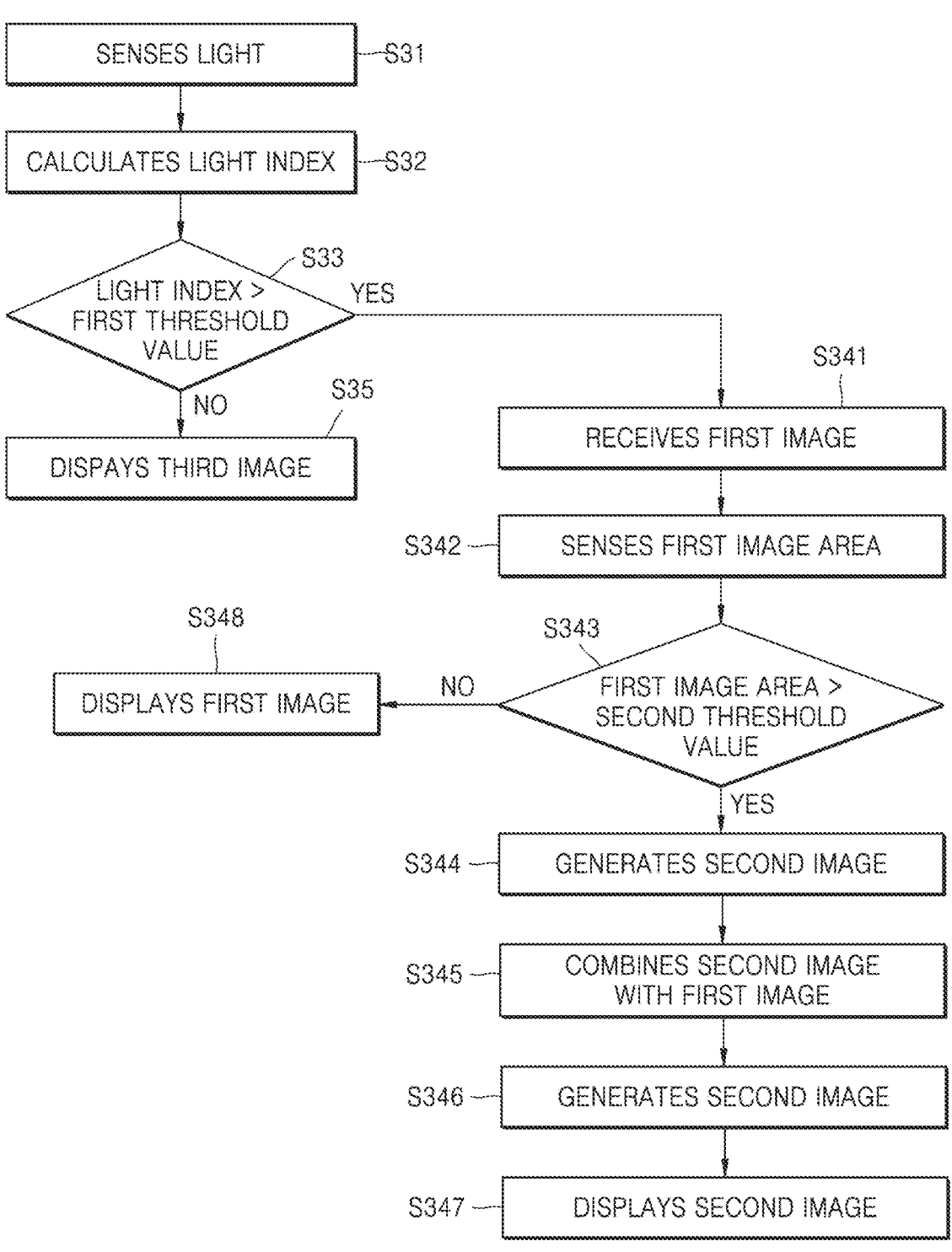
FIG. 18 is a block diagram illustrating in detail an image display method by a welding information providing device according to another embodiment.
Figure 19A:
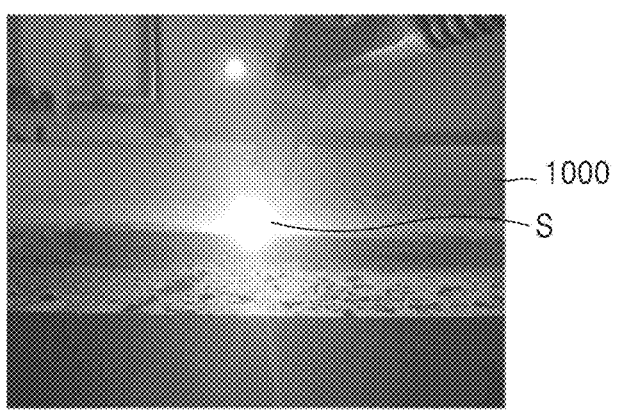
FIGS. 19A to 19C are diagrams illustrating a first image, a first image area, and a second image area described in FIG. 18
Figure 19B:
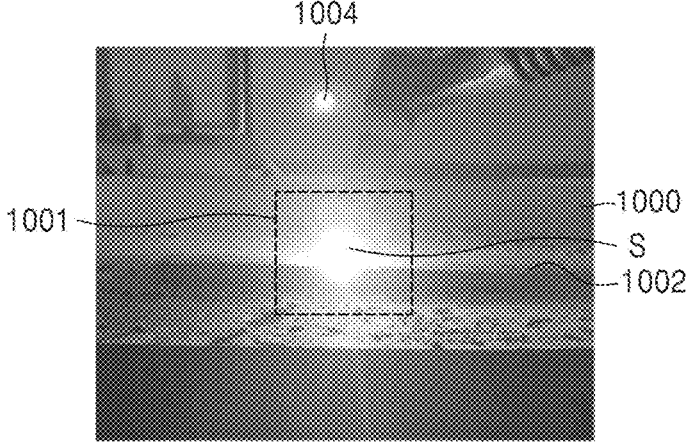
Figure 19C:
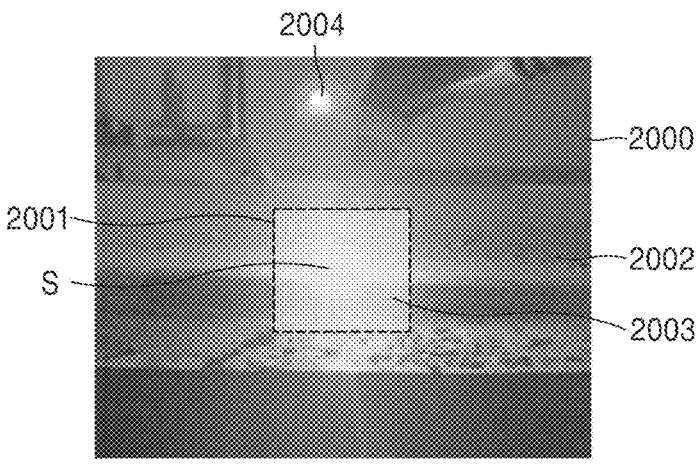

FIG. 18 is a block diagram illustrating in detail an image display method by the welding information providing device 100 according to an embodiment. FIGS. 19A to 19C are diagrams illustrating a first image, a first image area, and a second image area described in FIG. 18.

In operation S31, a degree of light in a welding operation area may be first sensed by the sensor unit 140. According to an embodiment, the sensor unit 140 may include an illuminance sensor module. Accordingly, the degree of light may correspond to illuminance data in the welding operation area. The detection of the degree of light is not necessarily sensed by the sensor unit 140, and illuminance data measured by a separately installed sensor may be transmitted to the first processor 150.

When data with respect to the degree of light is transmitted to the first processor 150, the first processor 150, particularly the light index calculating unit 151, calculates a light index in the welding operation area based on the data in operation S32. At this time, the welding operation area may be an area including a portion where welding is performed by the welding torch 200. Herein, as described below, the light index may correspond to data converted t compare the data with respect to the degree of light described above with a particular first threshold value.

In operation S33, the first processor 150, particularly the comparing unit 154, compares the light index with a preset first threshold value. The first threshold value may correspond to an illuminance value of light generated in a welding light spot as welding starts. The illuminance value of light generated in the welding light spot may vary depending on a type of welding and/or a state of welding, and the above-described threshold value may be a value corresponding to a type of welding and/or a state of welding that includes a lowest illuminance value. However, the disclosure is not limited thereto. The threshold value may be a plurality of values to respectively correspond to the type of welding and/or the state of welding.

Herein, when the light index is greater than the first threshold value, which indicates that the welding has started, therefore, the first processor 150, particularly the video receiving unit 152, receives a first image generated from the camera unit 110 in operation S341. A first image 1000 is an image including a welding light spot S as shown in FIG. 19A.

According to an embodiment, the first processor 150 may sense a first image area 1001 from the first image 1000 by the image area sensing unit 153 in operation S342, as shown in FIG. 19B.

According to an embodiment, the first image area 1001 may be an area including pixels in a certain range around a pixel having the greatest brightness compared to a surrounding area 1002 of the first image 1000.

The image area sensing unit 153 may sense a feature of the first image area 1001, and the feature of the first image area 1001 may include the brightness, the size, and/or a point of the first image area 1001. Optionally, the feature of the first image area 1001 may be a pixel having a greater brightness or a pixel having the greatest brightness compared to the surrounding area 1002 in a welding image.

The image area sensing unit 153 may detect a pixel having a greater brightness or a pixel having the greatest brightness compared to the surrounding area 1002 in the welding image. For example, the image area sensing unit 153 may detect a pixel having the greatest brightness in the first image 1000. The pixel having the greatest brightness in the first image 1000 is included in a welding light spot S image.

The image area sensing unit 153 may detect the brightness and/or brightness distribution of the first image area 1001 by the brightness detecting unit 1531. According to a more particular embodiment, the brightness detecting unit 1531 may detect the distribution of pixels in a certain brightness range around a pixel having a greater brightness compared to the surrounding area 1002 in the first image 1000. Optionally, the brightness detecting unit 1531 may detect the distribution of pixels in a certain brightness range around a pixel having the greatest brightness in the first image 1000.

Optionally, the image area sensing unit 153 may detect the size of the first image area 1001 by the size detecting unit 1532. According to a more particular embodiment, the size detecting unit 1532 may detect the size of the distribution of pixels in a certain area range around a pixel having a greater brightness compared to the surrounding area 1002 in the first image 1000. Optionally, the size detecting unit 1532 may detect the size of the distribution of the pixels in a certain area range around the pixel having the greatest brightness in the first image 1000.

Optionally, the image area sensing unit 153 may detect a point of the first image area 1001 by the point detecting unit 1533. According to a more particular embodiment, the point detecting unit 1533 may detect a point where the distribution of pixels in a certain brightness range around a pixel having a greater brightness compared to the surrounding area 1002 in the first image 1000 is located in the first image 1000. Optionally, the size detecting unit 1532 may detect a point where the distribution of pixels in a certain brightness range around a pixel having a greater brightness in the first image 1000 is located in the first image 1000.

After sensing the first image area 1001 to detect a feature thereof, such as brightness, size, and/or point, the first processor 150, particularly the comparing unit 154, compares the first image area 1001 with a preset second threshold value in operation S343. According to an embodiment, the comparing unit 154 of the first processor 150 may compare a brightness value of a pixel having the greatest brightness in the first image area 1001 with a second threshold value. The second threshold value may correspond to a brightness value of a welding light spot S image as welding starts. A brightness value of the welding light spot S image may vary depending on a type of welding and/or a state of welding, and the second threshold value described above may be a value corresponding to a type of welding and/or a state of welding that includes a lowest brightness value. However, the disclosure is not limited thereto. The second threshold value may be a plurality of values to respectively correspond to the type of welding and/or the state of welding.

When the feature of the first image area 1001 is higher than the second threshold value, the comparing unit 154 may allow the image generating unit 155 to generate a second image 2001 in operation S344. When the feature of the first image area 1001 is lower than the second threshold value, the comparing unit 154 may allow the video selecting unit 157 to select and provide the first image 1000 to a display unit in operation S348. The second image 2001 corresponds to an image in which the brightness value of the first image area 1001 is darkly filtered to a certain degree, and is formed to correspond to the size of the first image area 1001. Optionally, the second image 2001 is not necessarily newly generated by the image generating unit 155, and may be generated by changing the size and/or shape of an image in which a pre-filtered value is stored.

Next, in operation S345, the video generating unit 156 combines the second image 2001 with the first image 1000. When combining the second image 2001, after determining a location of the first image area 1001 in the first image 1000, the second image 2001 is combined with the location of the first image area 1001.

In this method, the second image 2001 is combined with the first image 1000 to generate a second image 2000 in operation S346, as shown in FIG. 19C. An area including the welding light spot S in the second image 2000 is darkly filtered by the second image 2001, such that a operator may perform a welding operation while accurately observing the welding light spot S included in the second image 2000 without glare. In addition, since the area including the welding light spot S does not have a large difference in brightness from the surrounding area 2002, a welding operation may be performed while observing the surrounding area 2002, thereby further improving the accuracy of the welding operation. In addition, welding may be performed more easily.

In the above-described embodiment, the image area sensing unit 153 senses the first image area 1001 around a pixel having the greatest brightness in the first image 1000. Accordingly, when a second light spot 1004 having a lower brightness than the welding light spot S is present in the first image 1000, the second light spot 1004 may not be sensed as an image area and the first processor 150 may not perform a separate process on the second light spot 1004. However, the disclosure is not limited thereto. According to another embodiment of the disclosure, when the second light spot 1004 present in the first image 1000 also has a brightness difference of a certain level or higher from the surrounding area 1002, the second light spot 1004 may be processed as the above-described image area to be darkly filtered.

In operation S347, the second video 2000 generated as described above is selected by the video selecting unit 157 of the first processor 150 and provided to the display unit 130.

Optionally, when the brightness value of the pixel having the greatest brightness in the first image area 1001 is less than the second threshold value, the video selecting unit 157 may not regard a corresponding light spot as a welding light spot and select the first image 1000 in which a separate darkening filter image process is not performed to provide to the display unit 130.

In addition, when the light index in operation S33 is less than the first threshold value, which is considered that a welding operation is not performed, the video selecting unit 157 may select a third image obtained by the camera unit 110 in a state illuminated by lighting and provide the third image to the display unit 130 in operation S35.

However, the disclosure is not limited thereto. When it is determined that welding is not performed, the camera unit 110 may be turned off and visual information may be provided through the automatic light-shading cartridge separately installed in the welding information providing device 100.

Figure 20:
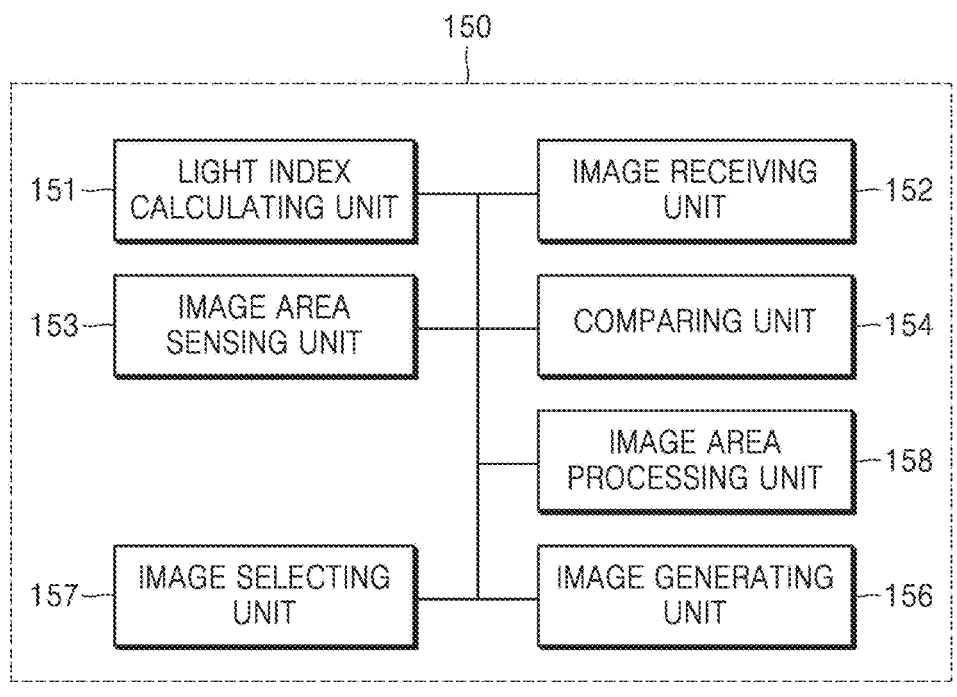
FIG. 20 is a block diagram of a first processor according to another embodiment of the disclosure.

FIG. 20 is a block diagram of the first processor 150 according to another embodiment of the disclosure. In FIG. 20, the same reference numerals are used for the same components as those in FIG. 16, and redundant descriptions thereof are omitted.

Unlike the first processor 150 shown in FIG. 16, the first processor 150 shown in FIG. 20 may not include an image generating unit 155 and may include an image area processing unit 158.

The image area processing unit 158 may perform a process of lowering a brightness value of each pixel existing in a sensed image area to a certain degree. Accordingly, the image area may be darkly filtered.

Figure 21:
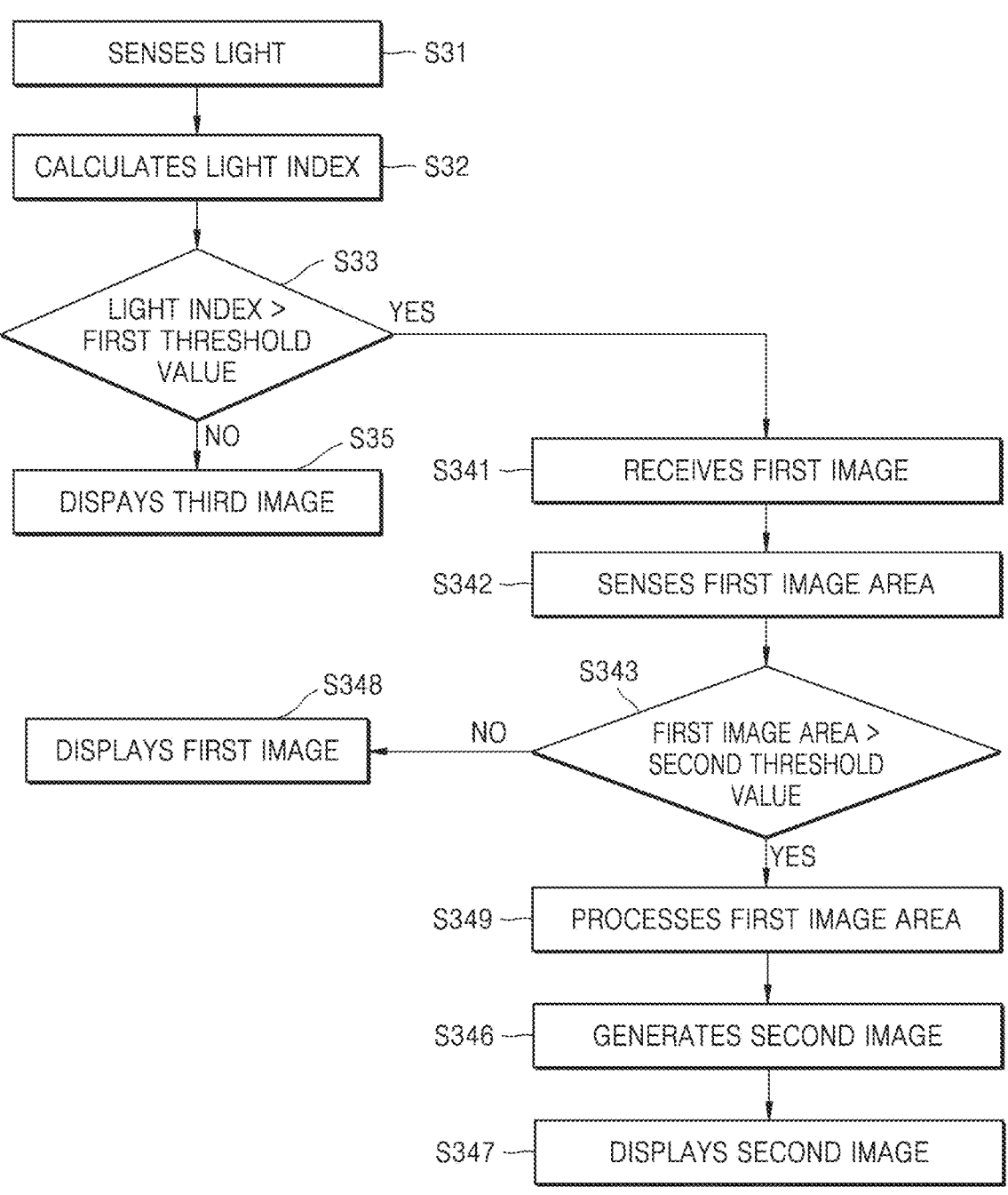
FIG. 21 is a block diagram illustrating in detail an image display method by a welding information providing device according to another embodiment.

FIG. 21 is a block diagram illustrating in detail an image display method by the welding information providing device 100 according to another embodiment, and is an image display method implemented by the first processor 150 shown in FIG. 20.

The image display method shown in FIG. 21 may be performed in the same method as the display method shown in FIG. 18 as a whole.

However, according to a result comparing the first image area 1001 with the preset threshold value by the first processor 150, in particular, the comparing unit 154 in operation S343, when the feature of the first image area 1001 is higher than the second threshold value, the image area processing unit 158 of the first processor 150 may perform darkening process on the first image area 1001 in operation S349. The darkening process may be a process of simultaneously lowering a brightness value of each pixel configuring the first image area 1001. Accordingly, as shown in FIG. 19C, the first image area 1001 may be a second image area 2003 configured by pixels in which the darkening process is performed, and as described in the embodiment described above, the second image 2000 in which the same effect as that obtained by combining the second image 2001 with the first image area 1001 is obtained may be generated in operation S346.

The rest of the components are the same as the embodiment shown in FIG. 18 described above, and detailed descriptions thereof will be omitted.

As described above, the embodiments of the disclosure performs a darkening filtering process on a portion showing high brightness in an image obtained from the camera unit 110, especially performing a darkening filtering process partially and/or relatively on a welding light spot, such that the welding light spot may be easily observed during a welding operation. Accordingly, even a beginner may easily perform a welding operation with high difficulty, and the accuracy and/or quality of welding may be improved. In addition, since a surrounding area may be easily observed during a welding operation, the safety during welding may be further increased.

All of the embodiments described in the disclosure may be applied to each other in combination with each other.

Although the welding information providing device 100 of the above-described embodiments has been described for use in a welding operation, the disclosure is not limited thereto. In other words, the welding information providing device 100 of the above-described embodiments may be implemented as an information providing device, and the information providing device may be used as an information providing device for medical and/or skin treatment while using the above configuration. That is, when performing an operation irradiating light having high brightness/high illuminance such as laser light, a user may adjust an output of a lighting unit according to a situation by using the information providing device for medical and/or skin treatment as described above, such that an environment capable of obtaining an optimal image while reducing unnecessary waste of power may be provided. In addition, an operation may be performed while observing a light spot accurately without glare by locally performing darkening filtering on an area including a light spot having high brightness/high illuminance only. In addition, the disclosure may also be used as an information providing device in various operations irradiating light having high brightness/high illuminance.

According to the disclosure, a high-quality image capable of easily identifying an environment surrounding welding in addition to a portion adjacent to welding light may be provided by synthesizing images obtained through various photographing conditions.

In addition, according to an embodiment of the disclosure described above, the welding quality may be improved by providing a operator an efficient guiding with respect to a current welding operation state.

An environment in which an optimal image may be obtained while reducing unnecessary waste of power by adjusting an output of a lighting unit according to a situation.

By performing a darkening filtering process on a portion showing high brightness in an image obtained from the camera unit, especially performing a darkening filtering process partially and/or relatively on a welding light spot, such that the welding light spot may be easily observed during a welding operation. Accordingly, even a beginner may easily perform a welding operation with high difficulty, and the accuracy and/or quality of welding may be improved.

In addition, since a surrounding area may be easily observed during a welding operation, the safety during welding may be further increased.

A scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A welding system (10) comprising: a display unit (130) comprising a front surface portion corresponding to a welding direction and a rear surface portion corresponding to a face portion direction; at least one eyepiece display (132) installed in an area of the rear surface portion of the display unit (130); at least one camera unit (110) installed in an area of the front surface portion of the display unit (130) and configured to obtain a plurality of welding image frames according to a photographing condition of each frame; and wherein the at least one camera unit (110) includes a first camera, a second camera and a thermal camera, wherein the at least one eyepiece display (132) includes a first eyepiece display (132-1) and a second eyepiece display (132-2), wherein the first camera is a camera corresponding to the first eyepiece display (132-1) and the second camera is a camera corresponding to the second eyepiece display (132-2), wherein the first camera and the second camera are configured to photograph a welding situation under different photographing conditions in a same frame, a processor (150) configured to: control the photographing condition of the camera unit (110), obtain a first intermediate synthesized image (f1) based on a first frame (d11) of the first camera and a first frame (e12) of the second camera, obtain a second intermediate synthesized image (f2) based on a second frame (d12) of the first camera and a second frame (e13) of the second camera, obtain a third intermediate synthesized image (f3) based on a third frame of the first camera and a third frame of the second camera, synthesize a first synthesized image (g1) by synthesizing the first intermediate synthesized image (f1) and the second intermediate synthesized image (f2), synthesize a second synthesized image (g2) by synthesizing the second intermediate synthesized image (f2) and the third intermediate synthesized image (f3), and control the first eyepiece display (132-1) to display the first synthesized image (g1) and the second eyepiece display (132-2) to display the second synthesized image (g2), wherein the first synthesized image (g1) and the second synthesized image (g2) synthesized a thermal image by the thermal camera, wherein the second intermediate synthesized image (f2) is commonly used in the generation of both the first synthesized image (g1) and the second synthesized image (g2), wherein the processor (150) is configured to synthesize the first intermediate synthesized image (f1) and the second intermediate synthesized image (f2) in parallel.

* * * * *